United States Patent
Boffi et al.

[11] Patent Number: 6,167,170
[45] Date of Patent: Dec. 26, 2000

[54] OPTICAL SWITCHING DEVICE

[75] Inventors: Pierpaolo Boffi, Voghera; Mario Martinelli, S. Donato Milanese; Davide Piccinin, S. Giuletta, all of Italy

[73] Assignee: Pirelli Cavi E Sistemi S.p.A., Milan, Italy

[21] Appl. No.: 09/096,567

[22] Filed: Jun. 12, 1998

Related U.S. Application Data

[60] Provisional application No. 60/050,357, Jun. 20, 1997.

[30] Foreign Application Priority Data

Jun. 19, 1997 [EP] European Pat. Off. .............. 97201874

[51] Int. Cl.[7] .............................. G02B 6/26; H04J 14/00
[52] U.S. Cl. ................................ 385/16; 385/11; 385/14; 385/15; 385/17; 385/24; 385/36; 359/115; 359/117; 359/122
[58] Field of Search .................................. 385/11, 14, 15, 385/16, 17, 24, 36, 122; 359/115, 122, 117; 372/10

[56] References Cited

U.S. PATENT DOCUMENTS

| 4,746,191 | 5/1988 | Kawakami et al. .................. 385/11 X |
| 5,223,975 | 6/1993 | Naganuma et al. .................. 385/11 X |
| 5,497,437 | 3/1996 | Hikami et al. ............................ 385/11 |
| 5,796,889 | 8/1998 | Xu et al. .................................... 385/24 |

OTHER PUBLICATIONS

Kasherininov et al.; "Light–Controlled Optical Elements for Optical Processing of Information and the Fiber–Optic Links", Telecommunications And Radio Engineering, vol. 45, No. 11, Nov. 1, 1990, pp. 71–75.

Ziari et al.; "Optical Switching in Cadmium Telluride Using a Light–Induced Electrode Nonlinearity", Applied Optics, vol. 32, No. 29, Oct. 10, 1993, pp. 5711–5723.

Liu et al.; "Logic Gate Modules Using Opto–Optical Birefringence Switching", Optics Letters, vol. 16, No. 18, Sep. 15, 1991, pp. 1439–1441.

Pietralunga et al.; "CdTe: In Monocrystal Modules for All–Optical Processing", Journal of Nonlinear Optical Physics and Materials, vol. 5, No. 2, (1996), pp. 247–268.

Boffi et al.; "Optical Time–to–Space Converter", Optics Communications, vol. 123, No. 4/6, Feb. 1, 1996, pp. 473–476.

Boffi et al.; "Photonic Sampler for 1550–nm Signals", Optics Letters, vol. 20, No. 6, Mar. 15, 1995, pp. 641–643.

*Primary Examiner*—Brian Healy
*Attorney, Agent, or Firm*—Finnegan, Henderson, Farabow, Garrett & Dunner, L.L.P.

[57] ABSTRACT

Optical switching device comprising:
a) first elementary switching module which in turn comprises i) a crystalline element without internal planes of separation and which is capable of rotating the plane of polarization of a polarized optical signal by a predetermined angle under the action of an optical control beam, and ii) a polarization analyzer capable of selecting, according to a predetermined plane, the said polarized optical signal issuing from the said crystalline element, b) first means for supplying the said polarized optical signal to the said elementary switching module, and c) second means for supplying the said optical control beam to the said elementary switching module, in which the said first and second means route at least two different polarized optical signals and at least one optical control beam in the said crystalline element such that the said at least one control beam is substantially collinear with and superimposed on the said at least two polarized optical signals.

29 Claims, 17 Drawing Sheets

OPTICAL SWITCHING DEVICE

This application is based on European Patent Application No. 97201874.1 filed on Jun. 19, 1997 and U.S. Provisional Application No. 60/050,357 filed on Jun. 20, 1997, pending, the content of which is incorporated hereinto by reference.

BACKGROUND OF THE INVENTION

The invention relates to an optical switching device. More particularly, the invention relates to an optically-controlled optical switching device.

Following the extensive development of optical fibre transmission systems, there is great awareness of the demand for devices capable of high-speed execution of different operations on the bits which constitute the digital information of an optical signal.

The current equipment used for processing the optical signals is inadequate for managing the ever-increasing transfer speeds possible in optical fibre transmission systems. In point of fact, equipment of this type consists of digital electronic devices with a limited band with respect to the optical band available in optical fibre transmission systems, and is based on a serial processing of information.

Hence, there is still great awareness of the need to make full use of the optical band available in optical fibre transmission systems by keeping the signal in an optical form, thus avoiding opto-electronic and electro-optical conversions.

Moreover, some compounds of a crystalline nature are known which are capable of transmitting polarized light onto a plane which, in given conditions, can be made to rotate. Examples of compounds of this type are some liquid crystals, e.g. CdTe:In, $Bi_{12}SiO_{20}$ and others.

In particular, CdTe:In becomes birefringent under the action of an electrical field, and the indices of refraction of the material vary according to variations in the intensity of the said field. A second property of this material is that, when the electrical field applied remains constant, the indices of refraction can be varied subsequently under the action of light.

The first of the aforementioned effects is commonly called the "electro-optical effect", and the second, the "photoconductive effect".

These properties of CdTe:In have been much investigated, and the hypothesis with the greatest credence at present is that an optical beam incident in a zone of a CdTe:In crystal subjected to a constant electrical field excites charge carriers in the conduction band from the impurity levels. Under the action of the said applied electrical field, these photogenerated charge carriers migrate into the adjacent dark region (not illuminated by the optical beam) where they are trapped.

The resultant spatial-charge density associated with the trapped charge carriers creates an opposite electrical field to the one applied.

At suitable intensities of the optical beam, the electrical field generated balances, in the illuminated zone, the one applied.

The effect thus created in the illuminated zone is called the "shielding effect". Hence, a polarized optical signal propagated in the illuminated zone of the optical control beam is guided by indices of refraction differing from those of the crystal to which only the electrical field has been applied.

On the other hand, given that the voltage along the crystal is constant, the reduction (or elimination) of the electrical field in the illuminated zone brings about an increase in the electrical field in the dark zone of the crystal (the enrichment effect) and a corresponding change in the indices of refraction of the material. Hence a polarized optical signal propagated in the dark (enriched) zone below or above the optical control beam travels on a plane of polarization different from that on which it would be propagated in the absence of the control beam, and different from that on which it would be propagated in the zone illuminated (or shielded) by the control beam.

William H. Steier et al ["Infrared power limiting and self-switching in CdTe", Appl. Phys. Lett., 53 (10), 840–841, (1988)] describe a power limiter and a "self-switch" which use the shielding effect of the electrical field generated by the photocharges created owing to the photoconductivity of CdTe:In at 1.06 μm. The devices described by these Authors utilize a single incoming optical beam which, with an increase in intensity, causes the shielding effect and allows the said beam to behave simultaneously like a signal and like a control beam.

William H. Steier et al ["Opto-optical switching in the infrared using CdTe", Optics Letters, 14 (4), 224–226, (1989)] describe a CdTe:In opto-optical switch for a signal with a wavelength of 1.06 μm and an optical control beam with a wavelength of 1.06 μm, which makes use of the photocharge generated by the optical control beam and the resultant shielding effect of the electrical field. However, the Authors have not taken into consideration the possibility of simultaneously propagating more independent polarized optical signals and the relevant collinear and superimposed control beams in the zone affected by the shielding effect of a single crystal.

Ziari M. Et al ["Infrared nonlinear neurons using the field shielding effect in CdTe", Applied Optics, 29 (14), 2074–2083, (1990)] describe an IR ray neuron which utilizes the shielding effect in CdTe:In, in which a single optical actuating (or control) beam, transverse or collinear with respect to the polarized optical signal, creates a spatial charge field dependent upon the intensity of the said beam.

Moreover, the Authors have utilized the birefringence caused by the electro-optical effect, i.e. the variation in the indices of refraction of the CdTe:In, in a basic one-neuron configuration, demonstrating that at high intensities of the actuating optical beam there is a nonlinear saturated response, with absorption losses less than or equal to 1.0 dB. Studies have also been made of both the functioning of the neuron with synchronous control pulses lasting microseconds, and the availability of both the inhibiting inputs (enriching effect) and the excitation inputs (shielding effect). Finally, other characteristics were discussed, including the option of a broadband response (0.9–1.4 μm) with incoherent inputs and a configuration for a bi-directional neuron which can be used in devices which learn from the counterpropagating error.

On page 2076, left-hand column, lines 4–7, the Authors assert that it is not necessary for the control beams originating from a plurality of sources to be accurately aligned. From this one is led to deduce that, in this experiment, the "shielding effect" caused by an optical control beam involves the entire crystal, and it is thus not possible to control independently of one other and in a single crystal, different polarized optical signals, by means of a plurality of control light beams.

Liu L. et al ["Logic gate modules using opto-optical birefringence switching", Optics Letters, 16 (18), 1439–1441, 1991] describe the use of a birefringence phenomenon to construct logic gates which output three logical functions. The logic gate modules described by the Authors consist of $Bi_{12}SiO_{20}$ opto-optical birefringent switches in which the polarized optical signal is propagated in the dark zone affected by the enrichment effect, of $LiNbO_3$ electro-optical half-wave plates, and of calcite plates. Each logic gate can be guided by optical control inputs parallel to the polarized optical signal, and electrically programmed to execute different logic operations. However, the Authors have never taken into account the possibility of simultaneously propagating a plurality of independent polarized optical signals and the relevant collinear and superimposed control beams in the zone affected by the shielding effect of a single crystal.

Liu L. et al ["Opto-optical switching using field enhancing effect in $Bi_{12}SiO_{20}$", Journal of Applied Physics, 72 (2), 337–343, 1992] describe a mathematical model of a $Bi_{12}SiO_{20}$ opto-optical switch which makes use of the photocharge created by the control beam, parallel to the polarized optical signal, and the resultant enrichment of the electrical field in the dark zones. The Authors analyze the enrichment effect of the electrical field and the electro-optical modulation with both the PocKels effect and the optical activity. On the basis of their mathematical treatment, the Authors set out various considerations regarding the design of the switches.

Ziari M. Et al ["Optical switching in cadmium telluride using a light-induced electrode nonlinearity", Applied Optics, 32 (29), 5711–5723, 1993] set out a theory and describe experimental results concerning the growth and erasure of an electrical field in the region just below the CdTe:In negative electrode as a function of the wavelength of optical control beams which are incident on the transparent negative electrode and propagate in the crystal perpendicularly to the direction of the polarized optical signals. The light (850–920 nm) absorbed by the impurities below the band gap causes the growth of a region with a very high electrical field ($E >> 20$ kV/cm) just under the negative electrode. Whilst the illumination has wavelengths above or in the region of (800–840 nm) the band gap, it can erase the high electrical field. The writing and erasing of the field depend upon the illumination and the Authors foresee its use, when combined with the electro-optical and electro-absorption effects, to produce one-dimensional infrared spatial modulators with polarized optical signal beams in the 900–1500 nm range which nonetheless use a totally different effect from the shielding effect (page 5715, right-hand column, lines 24–35). Moreover, they hypothesize the use of these to produce two-dimensional infrared spatial modulators. In this case, the control beams and the polarized optical signals would both propagate across transparent electrodes and along the direction of the electrical field applied (page 5719, right-hand column, lines 52–55).

Boffi P. et al ["Photonic sampler for 1550-nm signals", Optics Letter, 20 (6), 641–643, 1995] describe a device which extracts samples of configurable length from a 1550-nm polarized optical communication signal propagated in the region affected by the shielding effect, under the control of an optical control beam transverse to the polarized optical signal. The said device is produced by means of two indium-doped cadmium telluride switches (CdTe:In) and is characterized by a rise and fall time of 10 ns and by a sampling window of one microsecond in duration.

Boffi P. et al ["Optical time-to-space converter", Optics Communications, 123, 473–476, (1996)] describe an all-optical time-space converter, produced in free propagation, which translates binary time-coded words into equivalent space-coded words with a 1550 nm polarized optical communication signal which is propagated in the region affected by the shielding effect. Conversion is effected by means of four optical gates, one for each of the four polarized optical signals. Each optical gate comprises a first and second indium-doped cadmium telluride crystal (CdTe:In). There are two optical control beams, one for the first four crystals and one for the second four crystals, which they illuminate transversely.

Boffi P. et al ("Photonic time-space converter for digital communication signals", Optical Computing, Sendai, 12–13, 1996) describe a photonic subsystem which converts the time-coded bit sequence into an equivalent space-coded figure, with a 1550 nm polarized optical communication signal which is propagated in the region affected by the shielding effect, the said subsystem being made completely optically in free propagation under the control of an optical control beam which is transverse with respect to the polarized optical signal. The device used is that already described by Boffi P. et al in "Optical time-to-space converter", Optics Communications, 123, 473–476, (1996).

Pietralunga S. et al ["CdTe:In Monocrystal Modules for All-Optical Processing", Journal of Nonlinear Optical Physics and Material, 5 (2), 247–268, 1996], as well as summarizing the preceding work of Boffi et al, describe the application of the photoconductive properties of the n doped CdTe: In electro-optical monocrystal in order to process totally optically the $\lambda = 1550$ nm polarized optical signal which is propagated in the region affected by the shielding effect. The Authors describe different types of CdTe:In elementary modules with free-propagation architecture: a non-coherent wavelength converter, a switch, a sampler and a time-space converter. In the case of the switch, the sampler and the time-space converter, the optical control beam is transverse to the polarized optical signal which is propagated in the zone affected by the shielding effect. In the case of the non-coherent wavelength converter, the control beam may be collinear with the polarized optical signal. Nevertheless, on page 265, lines 13–16, the Authors expressly acknowledge that studies and experiments are still necessary to establish which type of illumination is most suitable to sample a plurality of polarized optical signals in a single crystal.

The state of the art thus suggests that the "shielding effect" caused by an optical control beam would involve the entire crystal, and it would hence not be possible to control various polarized optical signals in a single crystal independently of one another via a plurality of control light beams.

SUMMARY OF THE INVENTION

In the course of the present description and the claims:

the expression "signal superimposed on an optical beam" is used to designate a signal which is propagated in the same region in which an optical control beam is propagated;

the expression "signal collinear with an optical beam" is used to designate a signal which is propagated in the same direction in which an optical control beam is propagated;

the expression "a crystalline element without internal planes of separation" is used to distinguish a crystal from crystalline elements obtained by packing a plurality of crystals;

the expression "propagation in free space" is used to indicate all the modes of propagation of an optical signal not guided by an optical fibre.

Now, it has unexpectedly been found that it is possible to control, via one or more collinear optical control beams, a plurality of polarized optical signals which are propagated, independently of one another, in that region of a crystalline element without internal planes of separation which is affected by the shielding effect generated by the said optical control beams.

Hence, a first object of the present invention is constituted by an optical switching device comprising:

a) a first elementary switching module, in its turn comprising:
   i) a crystalline element without internal planes of separation, capable of rotating the plane of polarization of a polarized optical signal by a predetermined angle under the action of an optical control beam, and
   ii) a polarization analyzer capable of selecting, according to a predetermined plane, the said polarized optical signal issuing from the said crystalline element,
b) first means of supplying the said polarized optical signal to the said elementary switching module, and
c) second means of supplying the said optical control beam to the said elementary switching module, characterized in that
   the said first and second means direct at least two different polarized optical signals and at least one optical control beam into the said crystalline element, in such a way that the said at least one control beam is substantially collinear with and superimposed on the said at least two polarized optical signals.

Preferably, the said first and second means direct at least two different polarized optical signals and at least two optical control beams into the said crystalline element, in such a way that each of the said at least two control beams is substantially collinear with and superimposed on just one of the said at least two polarized optical signals.

More preferably, the said element of the said elementary switching module is composed of a monocrystal.

Even more preferably, the said monocrystal is of indium-doped cadmium telluride (CdTe:In).

Typically, the said monocrystal is associated with electrodes for applying a voltage selected so as to rotate by a predetermined angle the plane of polarization of the said at least two polarized optical signals.

In a preferred embodiment, the electrical field is applied perpendicularly to the side 1100 of the said crystal, whilst the signal and the control beam are applied perpendicularly to the side 1200.

The said optical switching device also comprises means of controlling, and if need be varying, the state of polarization of the said at least two polarized optical signals.

Typically, the said means of controlling, and if need be varying the state of polarization of the said at least two polarized optical signals comprise a pair of polarization rotators.

Preferably, the said pair of polarization rotators consists of two discs on which optical fibre coils are wound.

The diameter of the said coils is selected so as to make a $\lambda/4$ plate via a single winding of fibre.

In addition, the diameter of the said coils is selected so as to make a $\lambda/2$ plate via two windings of fibre.

The said optical switching device also comprises means of collimation disposed downstream of the said means capable of controlling and, if need be, varying the state of polarization, and upstream of the said elementary switching module, so as to guide the said at least two polarized optical signals in free space in a predetermined direction and keep them within predetermined transverse dimensions.

Typically, the wavelength of the said at least two polarized optical signals lies between 1000 and 1600 nm.

Preferably, the said second means consist of a laser source which generates an optical control pulse beam.

More preferably, the said source is a Q-switched laser.

According to a preferred embodiment, the said optical switching device also comprises at least one second elementary switching module.

Typically, the polarization analyzer of the said first elementary module is oriented substantially orthogonally with respect to the polarization analyzer of the said at least one second elementary module.

Preferably, the said first and the said at least one second elementary switching module are arranged in series.

Further, the said second means also comprise a means of splitting the said optical control beam into a first and at least one second optical control beam.

Preferably, the said optical switching device also comprises means capable of guiding the said first and the said at least one second optical control beam to the crystalline element, capable of rotating the plane of the said polarized optical signal by a predetermined angle under the action of the said optical control beam, of the said first and of the said at least one second elementary switching module, respectively.

More preferably, the said guiding means capable of guiding the said first optical control beam consist of a first optical fibre.

Even more preferably, the said guiding means capable of guiding the said at least one second optical control beam consist of at least one second optical fibre.

Preferably, the said first optical fibre and the said at least one second optical fibre are of different lengths, so that the said first and the said at least one second optical control beams arrive at different times at the said element of the said first and the said at least one second elementary switching module, respectively.

The said optical switching device also comprises a dichroic mirror disposed downstream of the said first elementary module and upstream of the said at least one second elementary module.

Typically, the said dichroic mirror is transparent to the wavelength of the said at least two polarized optical signals and reflects the wavelength of the said first and the said at least one second optical control beam.

Preferably, the said dichroic mirror is substantially tilted by 45° with respect to the direction of the said at least two polarized optical signals and of the said first optical control beam, the direction of the said at least two polarized optical signals being substantially orthogonal with respect to the direction of the said first optical control beam.

More preferably, the said dichroic mirror is substantially tilted by 45° also with respect to the direction of the said at least one second optical control beam, the direction of the said at least two polarized optical signals being substantially orthogonal also with respect to the direction of the said at least one second optical control beam.

Further, the said optical switching device comprises means of collimation to guide in free space the said first and the said at least one second optical control beam so that they are incident on the said dichroic mirror at approx. 45° and that, after being reflected from the said dichroic mirror, are substantially collinear with and superimposed on the said at least two polarized optical signals.

The peculiar characteristic of the optical switching device according to the invention consists in the fact that the said device enables the simultaneous transmission of a plurality of independent polarized optical signals and the relevant optical control beams in the zone affected by the shielding effect of a single crystalline element without internal planes of separation.

This has the advantage of allowing the creation of a much more compact device of simplified structure with respect to those conventional devices using the shielding effect in as many monocrystals as there are polarized optical signals to be processed, each one having independent electrodes.

Moreover, the device according to the invention guarantees uniformity of performance for each signal, eliminating the need to select a plurality of crystals with identical characteristics.

Further, in a preferred embodiment utilizing a CdTe:In monocrystal, the optical switching device according to the invention allows the processing of polarized optical signals with wavelengths (approx. 1300 and 1550 nm) typical of second- and third-window optical fibre transmission systems.

BRIEF DESCRIPTION OF THE DRAWINGS

Characteristics and advantages of the invention will now be illustrated with reference to the embodiments given by way of nonlimiting example, in the attached drawings, in which.

DETAILED DESCRIPTION OF THE INVENTION

Figure 1:
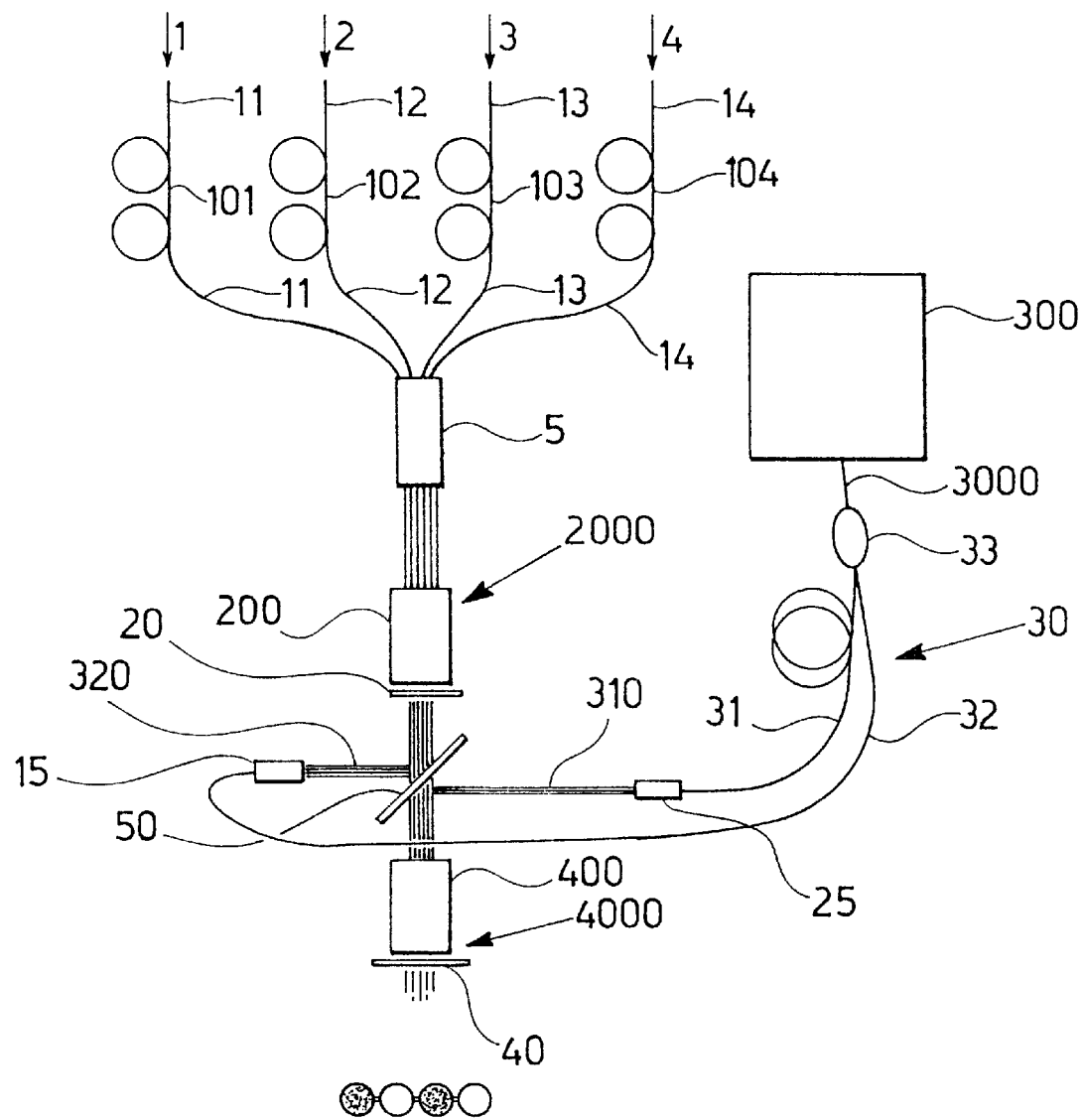
FIG. 1 shows an embodiment of an optical switching device according to the invention.

The embodiment in FIG. 1 represents an optical switching device for four 1550-nm polarized optical signals 1, 2, 3 and 4 originating respectively from four optical fibres 11, 12, 13 and 14 and generated by means not shown in the figure, such as for example a laser source.

As shown in FIG. 1, the device comprises means 101, 102, 103 and 104 for controlling, and if need be varying, the state of polarization of the said four polarized optical signals 1, 2, 3 and 4.

In a preferred embodiment, the said means 101, 102, 103 and 104 for controlling, and if need be varying, the state of polarization of the said four polarized optical signals 1, 2, 3 and 4 consist of four polarization controllers, consisting in their turn, for example, of four pairs of polarization rotators made of optical fibre. Preferably, each pair of polarization rotators consists of two discs made, for example of metal and/or plastics and of appropriate diameter, on which optical fibre coils are wound. The said coils induce in the fibre a birefringence in the normal plane to the direction of propagation of the said polarized optical signals 1, 2, 3 and 4. By making the said coils of the appropriate diameter, it is possible to make a $\lambda/4$ plate by means of one winding of fibre and a $\lambda/2$ plate by means of two windings. Given that any state of polarization may be achieved through the rotation of a $\lambda/2$ plate and a $\lambda/4$ plate, the state of polarization of each of the said four polarized optical signals 1, 2, 3 and 4 may be regulated with great precision via the said means 101, 102, 103 and 104.

Means of collimation 5 downstream of the said means 101, 102, 103 and 104 capable of controlling, and if need be varying, the state of polarization of the said polarized optical signals 1, 2, 3 and 4 serve as an interface between an optical-fibre guided-propagation section and one in free space (approx. 20 cm) in which are found a first (2000) and a second (4000) elementary switching module. The said means 5 are capable of collimating the said four polarized optical signals 1, 2, 3 and 4 issuing from the said means 101, 102, 103 and 104 for controlling, and if need be varying, the state of polarization for the entire section in free space and of keeping them substantially parallel and within the transverse dimensions of the said first and second elementary optical switching module 2000, 4000.

Figure 2:
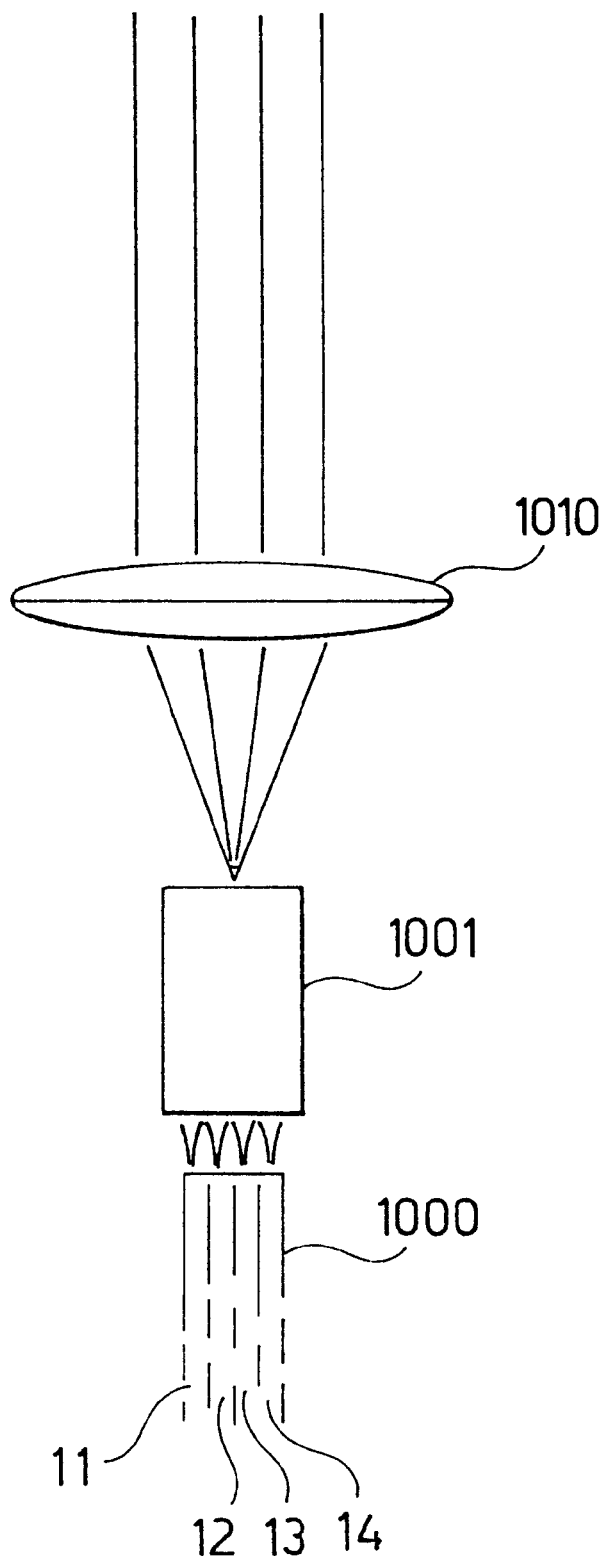
FIG. 2 shows means of collimation for four polarized optical signals of the device in FIG. 1.

As is shown in FIG. 2, the said optical fibres 11, 12, 13 and 14 issuing from the said means 101, 102, 103 and 104 capable of controlling, and if need be varying, the state of polarization, are disposed in a linear geometry with substantially the minimum dimensions. The said linear geometry can be obtained by removing the plastic coating from the said four optical fibres 11, 12, 13 and 14, and gluing the said stripped fibres next to one another on an glass support.

Since the external diameter of the cladding of the 1550 nm monomodal fibres is approx. 125 mm, the overall size of an array 1000 of fibres thus made is approx. 500 μm. The distance between the outermost polarized optical signals 1 and 4 issuing from the said array 1000 is hence approx. 375 μm.

A grin-type lens 1001 with a pitch equal, for example, to 0.25, collimates the said four polarized optical signals on the issuing of the said array 1000. The functioning of the said grin lens 1001 is based on a radial variation of the index of refraction instead of the curvature of the lateral surfaces like conventional lenses. The said grin lens 1001 is preferable to a conventional lens because it can be placed immediately after the said fibres 11, 12, 13 and 14 of the said array 1000, thus enabling all of the said polarized optical signals 1, 2, 3 and 4 to be collected on issuing from the array 1000 before they diverge excessively.

In the embodiment in FIG. 2, a convex lens 1010 with a focal equal to approx. 80 mm is disposed at a distance of approx. 8 cm from the said grin lens 1001 to correct the divergence of the said four polarized optical signals 1, 2, 3 and 4 issuing from the said grin lens 1001. In point of fact, the said four polarized optical signals 1, 2, 3 and 4 entering the said grin lens 1001, are shifted with respect to the axis of the said lens 1001 and hence, issuing from the said lens 1001, have an excellent collimation, but a considerable divergence.

At the output of the said means of collimation 5, the said four polarized optical signals 1, 2, 3 and 4 are substantially well collimated and parallel for the entire section in free space. In particular, the two outermost polarized optical signals 1 and 4 are separated by approx. 3.8 mm.

According to a variant not shown, the previously-described means of collimation 5 can be made by means of an array of microlenses, one for each of the said four polarized optical signals 1, 2, 3 and 4.

Figure 9A:
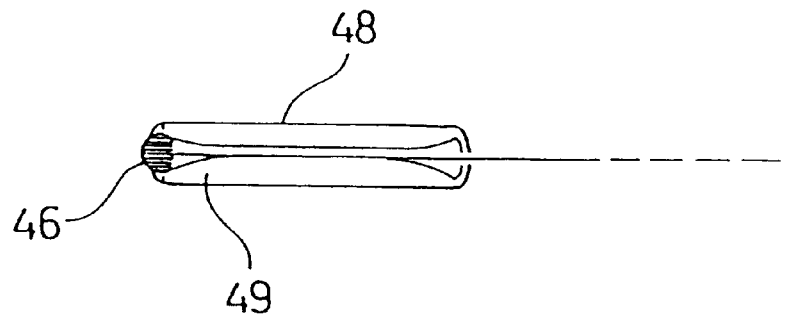
FIGS. 9(a)–9(b) show an embodiment of means of collimation for eight digital optical signals of an optical switching device according to the invention.
Figure 9B:
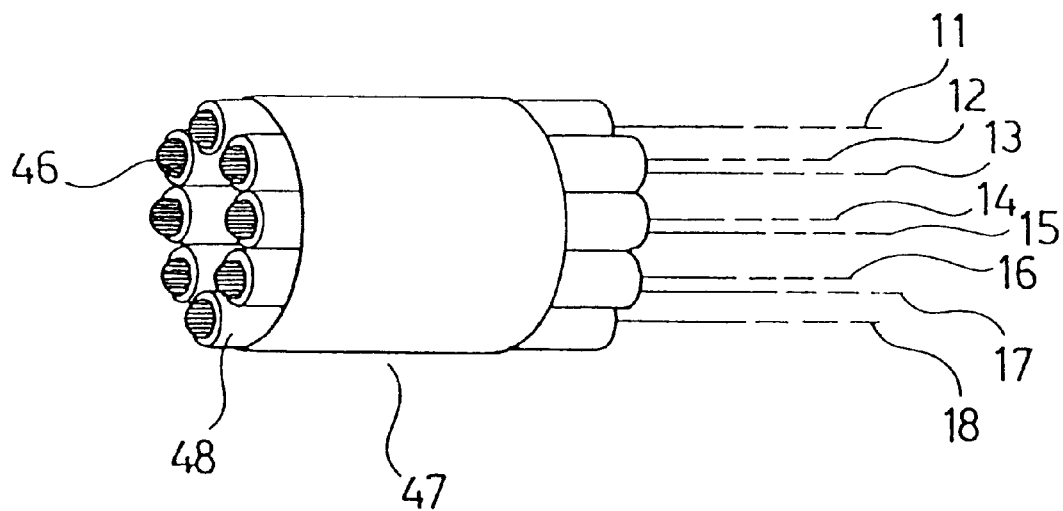

Finally, FIGS. 9a and 9b illustrate means of collimation 5 for an optical switching device (not shown) similar to that in FIG. 1, but which processes eight polarized optical signals originating from eight optical fibres 11, 12, 13, 14, 15, 16, 17 and 18 issuing from eight polarization controllers 101, 102, 103, 104, 105, 106, 107 and 108 (not shown). The said means of collimation 5 comprise a circular array 47 (FIG. 9b) of eight collimators 48 (FIG. 9a) in which the said circular array 47 has, for example, an external diameter of approx. 3.6 mm and each of the said collimators 48 has a diameter of approx. 1 mm.

A spherical collimation lens 46 with a diameter of approx. 600 μm is preferably present at one end of each of the said collimators 48.

The coupling of each of the said eight optical fibres with each of the said spherical lenses 46 is preferably accomplished via a glass microcapillary 49 with an external diameter of 1 mm, an internal bore of 126 μm (1 μm greater than the diameter of the 1550 nm monomode fibre cladding) and two conical widenings at the ends. The said two conical widenings serve at the one end as an aid for inserting one of the said eight fibres and, at the other end, to accommodate and to glue the said spherical lens 46 (FIG. 9a).

The focus of the said spherical lens 46 is preferably positioned on the surface of the said sphere such that the said eight optical fibres may be inserted and glued onto the said spherical lenses 46 without the need for specific measures for locating the best point for the collimation.

The said eight collimators 48 thus made are then inserted in a circle between two metal tubes, each with a predetermined diameter, one inside and the other outside the circular array 47, so as to obtain a substantially regular and symmetrical arrangement.

The said circular array 47 of the said eight collimators 48 thus enables the said eight polarized optical signals to be kept, by diffraction, between the transverse dimensions (approx. 5×5 mm) of the said first and second elementary optical switching modules 2000 and 4000, and at the same time enables avoidance of the superimposition of the said eight polarized optical signals by divergence along the entire section in free propagation (approx. 20 cm) of the device according to the invention.

Figure 3A:
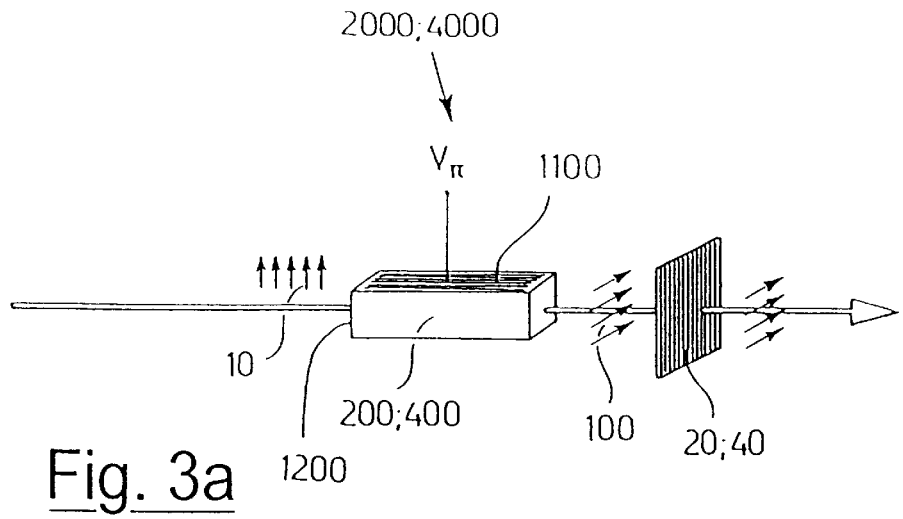
FIGS. 3(a)–3(b) show the functioning of an elementary optical switching module of the device in FIG. 1.
Figure 3B:
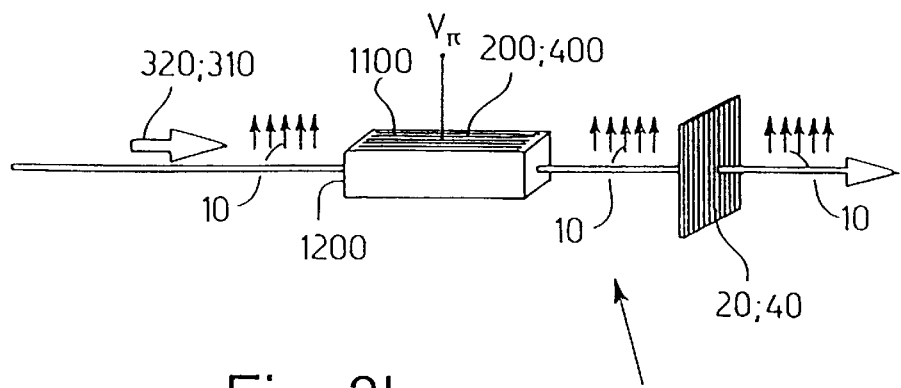

As shown in FIGS. 3a and 3b, the said first elementary switching module 2000 preferably consists of an indium-doped cadmium telluride monocrystal (CdTe:In) 200, and a polarization analyzer (20).

The said monocrystal 200, of dimensions equal, for example, to approx. 5×5×15 mm, is placed in a Plexiglas assembly with openings corresponding to the input and output faces of the said polarized optical signals 1, 2, 3 and 4, and, inside, is equipped with electrodes to which a voltage is to be applied.

In this embodiment the signal is propagated perpendicularly to the electrical field applied.

The said polarization analyzer 20 preferably consists of a polarization divider cube.

The state of polarization, represented in FIGS. 3a and 3b by the arrows 10, of the said polarized optical signals 1, 2, 3 and 4 entering the said first elementary module 2000, is regulated, as mentioned earlier, via the said means 101, 102, 103 and 104 capable of controlling, and if need be varying, the state of polarization. The said regulation is accomplished such that the said polarized optical signals 1, 2, 3 and 4 are linearly polarized at 45° with respect to the axes of birefringence induced in the said monocrystal 200. The said birefringence is induced by applying to the said monocrystal a voltage capable, through the electro-optical effect, of rotating by 90° the plane of polarization 10 of the said polarized optical signals 1, 2, 3 and 4, such as to obtain a plane of polarization, represented by the arrows 100, substantially orthogonal to the incoming plane of polarization 10.

The said polarization analyzer 20 is oriented so as to block (FIG. 3a) the said optical signals 1, 2, 3 and 4, polarized according to the plane of polarization 100 originating from the said monocrystal 200. In this condition (OFF state) the said elementary module 2000 is closed and does not permit transmission of the said polarized optical signals 1, 2, 3 and 4.

Illuminating the said monocrystal 200 with a first 1064-nm optical control beam 320 (wavelength at which the CdTe:In shows a peak of photo-conductivity), the shielding effect generated by the photogenerated charge carriers inhibits the electro-optical effect in the illuminated zone of the said first optical control beam 320. Consequently, the plane of polarization 10 of the said polarized optical signals 1, 2, 3 and 4 which are propagated in the illuminated region of the said monocrystal 200 is no longer rotated, and the said analyzer 20 lets them pass, as shown in FIG. 3b (ON state). The said monocrystal 200 is characterized by two response times:

a time $t_{on}$ relating to the carrier photogeneration process and to the creation of the reverse field (shielding effect), and a time $t_{off}$ relating, on the other hand, to the recombination process of the said charges and to the restoration of the initial conditions.

Experiments have shown that the time $t_{on}$ is very quick (typically, a few ns) and tends to follow exactly the rise time of the said first optical control pulse 320 when the latter has a density of sufficiently high power (greater than approx. $10^5$ W/cm$^2$). The time $t_{off}$, on the other hand, is much slower (typically a few μs) and is closely correlated with the spatial distribution of the said first optical control beam 320. For this reason, with only the said monocrystal 200 it is not possible to make a device with a response speed of the order of nanoseconds.

An important characteristic of the said monocrystal 200 consists in the fact that it is substantially transparent (having an absorption coefficient of less than approx. 0.2 cm$^{-1}$) to wavelengths greater than approx. 1250 nm. Therefore, the optical switching device according to the invention can be utilized in second- and third-window optical communication systems.

The description of, and considerations made with regard to, the said first elementary switching module 2000, also apply for the said second switching module 4000.

Figure 4:
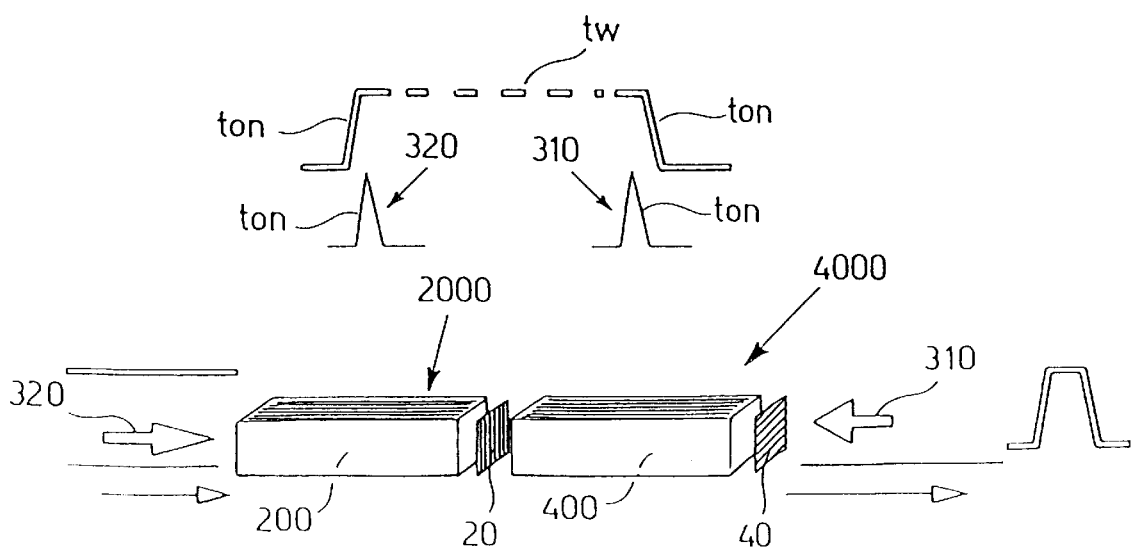
FIG. 4 shows the functioning of two elementary optical switching modules of the device in FIG. 1.

As is shown in FIG. 4, the said first and second elementary switching modules 2000 and 4000 are arranged in series, with their respective polarization analyzers 20 and 40 perpendicular to one another (cross-oriented), and are controlled via a first and a second optical control pulse beam 320 and 310, collinear with and superimposed on the said polarized optical signals 1, 2, 3 and 4, and which are delayed with respect to one another by a predetermined time.

Initially, the plane of polarization 10 of the said polarized optical signals 1, 2, 3 and 4 entering the said monocrystal 200 of the said first elementary module 2000 is rotated by the electro-optical effect and, on issuing from the said monocrystal, the said polarized optical signals 1, 2, 3 and 4 are blocked by the said polarization analyzer 20 (1$^{st}$ module OFF state). On the arrival of the said first optical control pulse 320, the shielding effect created by the photogenerated charge-carriers inhibits the electro-optical effect in the illuminated region of the said monocrystal 200 of the said first elementary module 2000 (1$^{st}$ module ON state). The said polarized optical signals 1, 2, 3 and 4 which are propagated in the region affected by the shielding effect of the said monocrystal 200, can thus cross the said polarization analyzer 20 of the said first elementary module 2000 and enter the said monocrystal 400 of the said second elementary module 4000, where their plane of polarization undergoes a 90° rotation owing to the electro-optical effect. Since the said polarization analyzer 40 of the said second elementary module 4000 is oriented substantially perpendicularly with respect to the said polarization analyzer 20 of the said first elementary module 2000, the OFF state of the second module 4000 permits the said polarized optical signals 1, 2, 3 and 4 to be transmitted with a response time equal to $t_{on}$ and to issue from the said device. The said optical switching device would remain in the said conditions, and hence open, for the entire off-time $t_{off}$ of the said monocrystal 200 of the said first elementary module 2000.

In order to obtain an opening time duration of the said device of less than $t_{off}$, guiding means 30 lead the said second control pulse 310 to the said monocrystal 400 of the said second elementary module 4000 after a predetermined time interval $t_w$ less than $t_{off}$. Consequently, the second elementary module 4000 is actuated (2$^{nd}$ module ON state), the said polarized optical signals 1, 2, 3 and 4 are no longer subject, because of the shielding effect, to the rotation of their own plane of polarization and are thus interrupted by the said analyzer 40 of the said second module 4000, with a response time equal to $t_{on}$.

The duration of the opening time of the said device in FIG. 1 can be chosen by selecting the delay $t_w$ between the said first and second optical control pulses 320 and 310. This length of time $t_w$ must not be greater than the off-time $t_{off}$ typical of the said monocrystals 200 and 400. Moreover, it must not be less than $t_{on}$ in order to allow the said monocrystal 200 of the said first module 2000 to respond to the said first control pulse 320.

Figure 5:
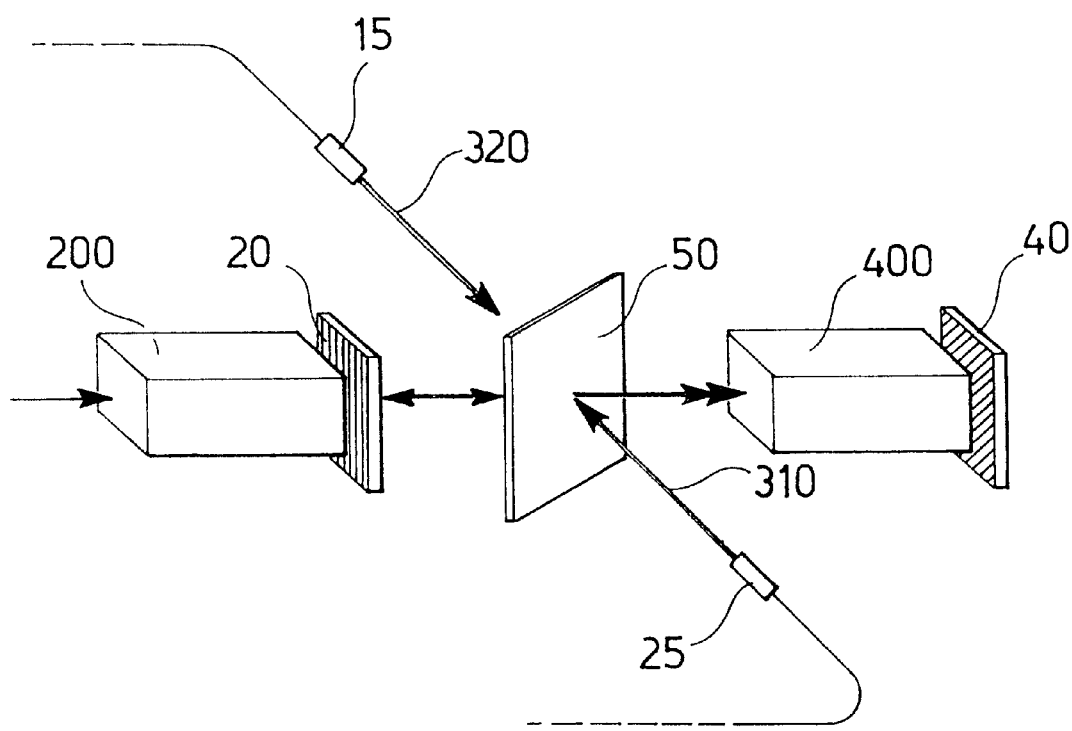
FIG. 5 shows the functioning of a dichroic mirror placed between two elementary modules of the device in FIG. 1.

According to the embodiment illustrated in FIG. 5, between the said first and second elementary modules 2000 and 4000 is placed a dichroic mirror 50 which is transparent to the wavelength of the said polarized optical signals 1, 2, 3 and 4 which is approx. 1550 nm, and reflects the wavelength of the said first and second optical control beams 320 and 310 which is approx. 1064 nm. The said dichroic mirror 50 is substantially tilted by 45° with respect to the direction of propagation of both the said polarized optical signals 1, 2, 3 and 4 and the said first and second optical control beams 320 and 310 (FIG. 5). The said first control beam 320, coming from a direction substantially perpendicular with respect to that of the said polarized optical signals 1, 2, 3 and 4, after being reflected onto the said dichroic mirror 50 is incident on the said monocrystal 200 of the said first module 2000 in a collinear direction and superimposed on the said polarized optical signals 1, 2, 3 and 4 but is opposite in direction (counter-propagating illumination).

In its turn, the said second control beam 310, which also originates from a direction substantially perpendicular with respect to that of the said polarized optical signals 1, 2, 3 and 4, after reflecting onto the said dichroic mirror 50, is incident on the said monocrystal 400 of the said second module 4000 in a collinear direction and superimposed on the said polarized optical signals 1, 2, 3 and 4, and has the same direction (copropagating illumination). Both modes of illumination, counterpropagating and copropagating, are equally efficient for switching purposes.

Although in the example described the dichroic mirror 50 is tilted at 45°, other angles of tilt are equally possible. In this case the said control beams 320 and 310 must be incident on the dichroic mirror 50 at such an angle so as to be reflected in a direction which is substantially collinear with the said polarized optical signals 1, 2, 3 and 4.

Figure 15:
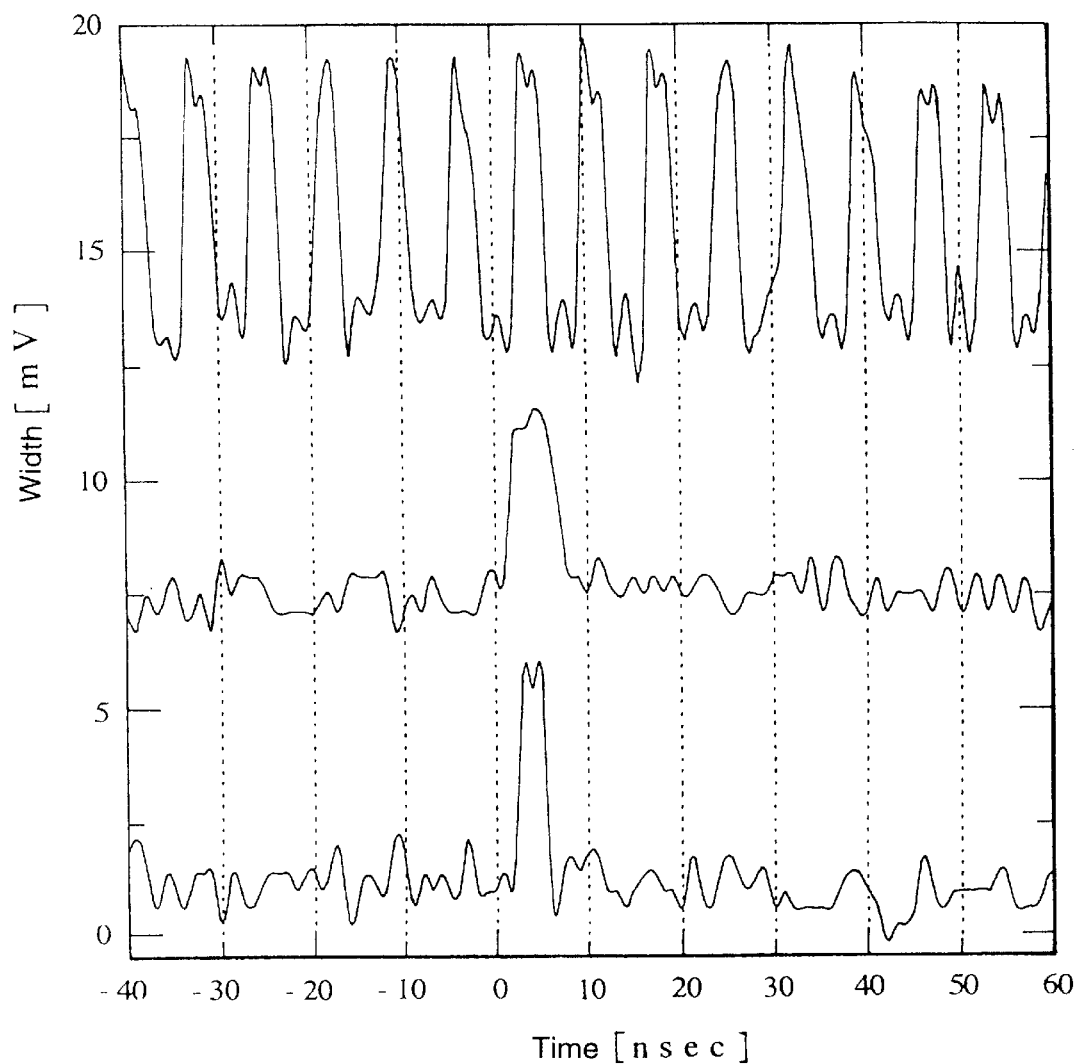
FIG. 15 provides a graphic representation of a digital optical signal entering (top line) and issuing from (bottom line) the device in FIG. 1, and the opening time trend (centre line) of the said device.

FIG. 15 shows the recording, obtained via a suitable photoreceiver and oscilloscope having passbands of approx. 1 GHz, of a 1-bit selection (bottom line) from a 140 Mbit/s polarized digital optical signal (top line) entering an optical switching device as described in FIG. 1 which processes the polarized optical signal under the control of the said first and second optical control beams 320 and 310. The opening-time trend of the device is represented by the central line of FIG. 15.

Figure 16:
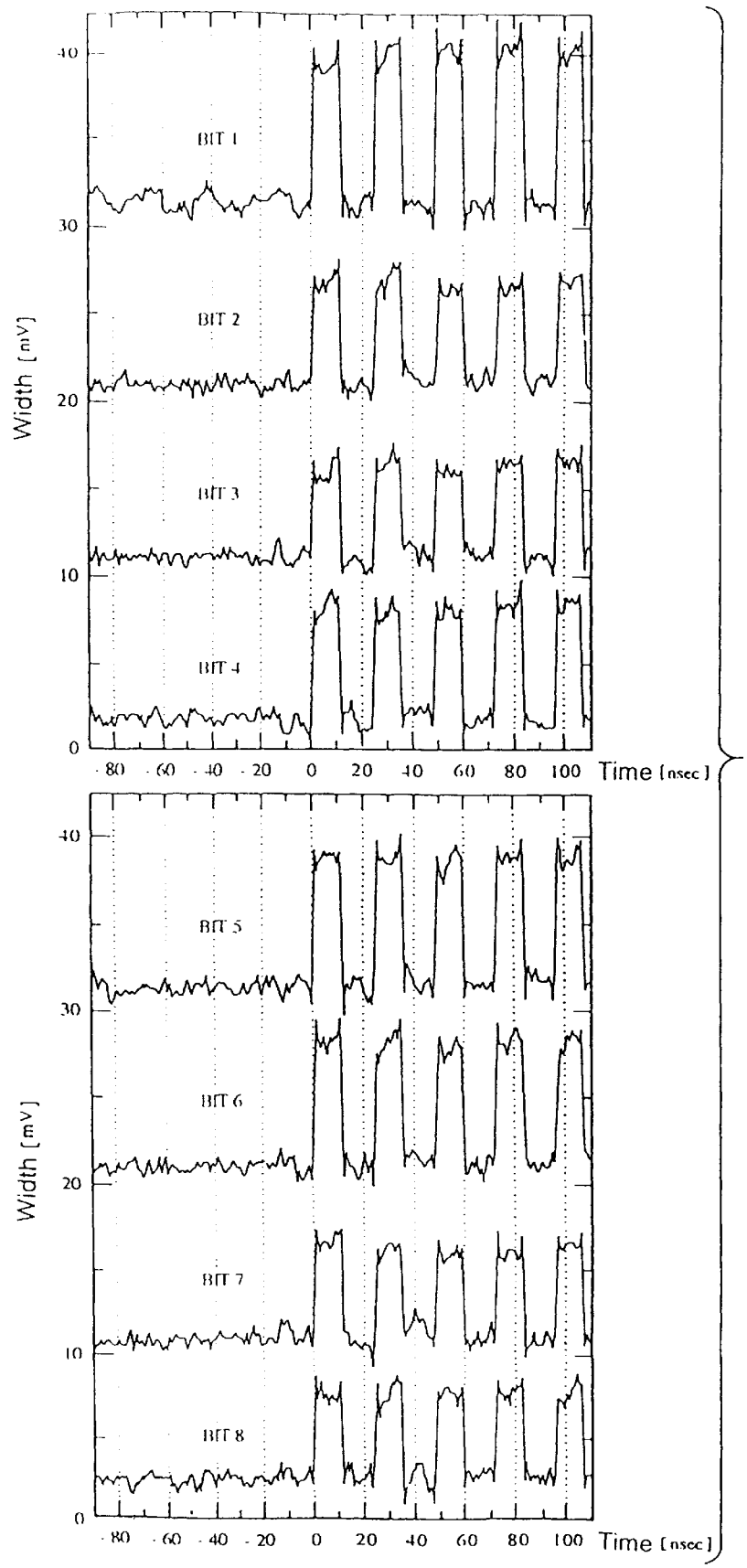
FIG. 16 provides a graphic representation of eight digital optical signals issuing from the device in FIG. 1.

FIG. 16 shows the recording, obtained via a suitable photoreceiver and oscilloscope having passbands of approx. 1 GHz, of eight 50 Mbit/s polarized digital optical signals issuing from an optical switching device similar to that in FIG. 1, but which processes eight polarized digital optical signals under the control of the said first and second optical control pulse beams 320 and 310. The said eight polarized digital optical signals, which are propagated in the said first and second in-series monocrystals 200 and 400, do not interfere with one another.

Figure 18:
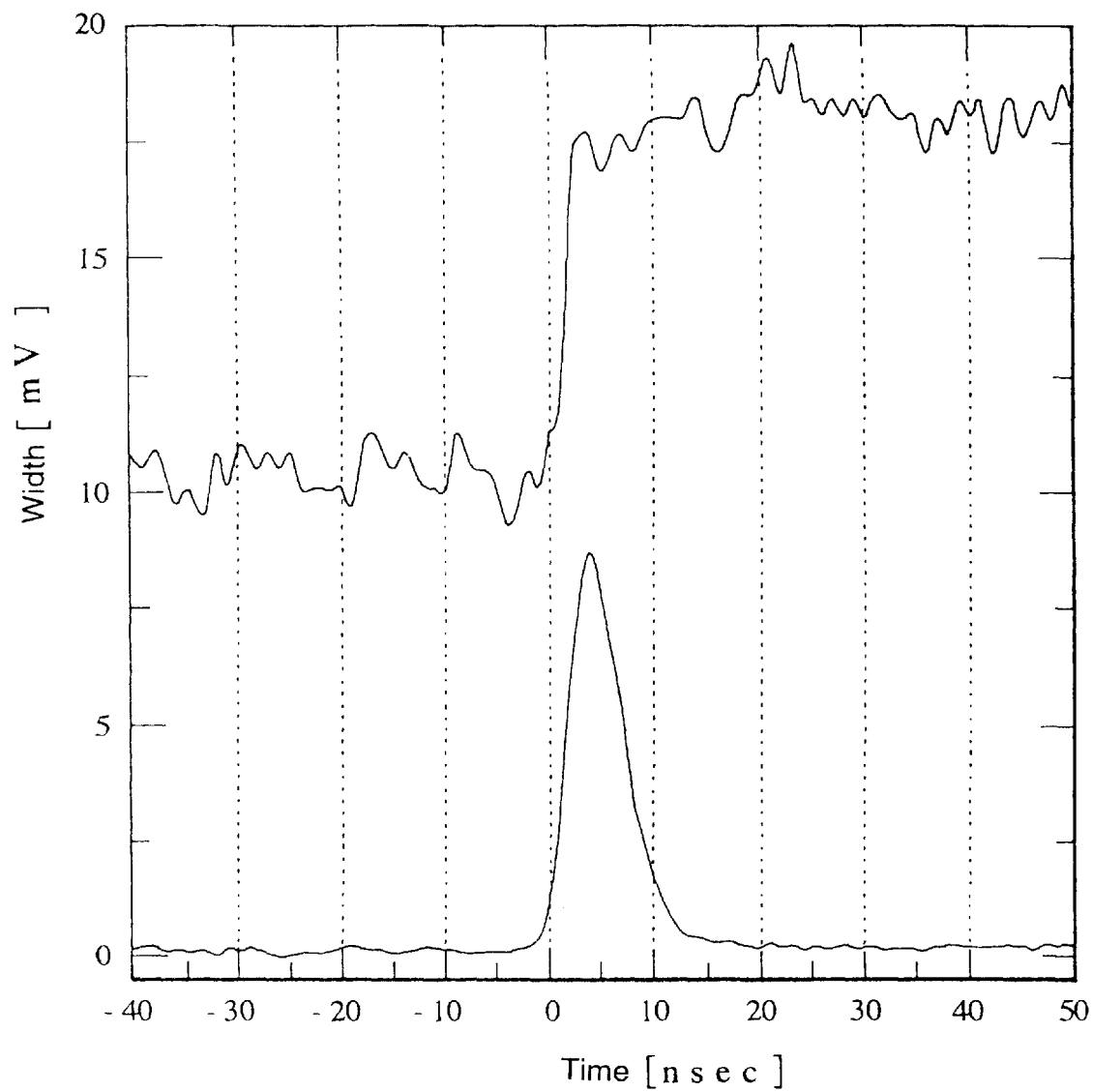
FIG. 18 provides a graphic representation of the trend of the response time $\tau_{on}$ (top line) and of an optical control pulse (bottom line) in the optical switching device in FIG. 1.

In the illustrated examples, the said optical control pulses 320 and 310 had an energy of approx. 1 mJ and a rise time of approx. 3 ns. FIG. 18 shows the trend of such an optical control pulse (bottom line) and of the response time $\tau_{on}$ (top line), equal to approx. 3 ns, of the optical switching devices utilized.

In particular, in the device according to the invention, in the event that it is wished to operate on each of the said four polarized optical signals 1, 2, 3 and 4 independently of one another, the said first and second optical control beams 320 and 310 shall consist of a first and second array of four optical control beams (a, b, c, d) and (a', b', c', d') respectively, and each of the said four polarized optical signals 1, 2, 3 and 4 shall therefore be propagated in the region illuminated by only one of the said four optical control beams (a, b, c, d) in the first monocrystal 200, and by only one of the said four optical control beams (a', b', c', d') in the second monocrystal 400, and collinearly to it.

The results of experiments show that, contrary to expectation, when a plurality of polarized optical signals and the relevant optical control beams are propagated in a single monocrystal, the shielding effect created by a first optical control beam does not influence the propagation of polarized optical signals surrounding the signal which is propagated in the region illuminated by the said first optical control beam.

Figure 8:
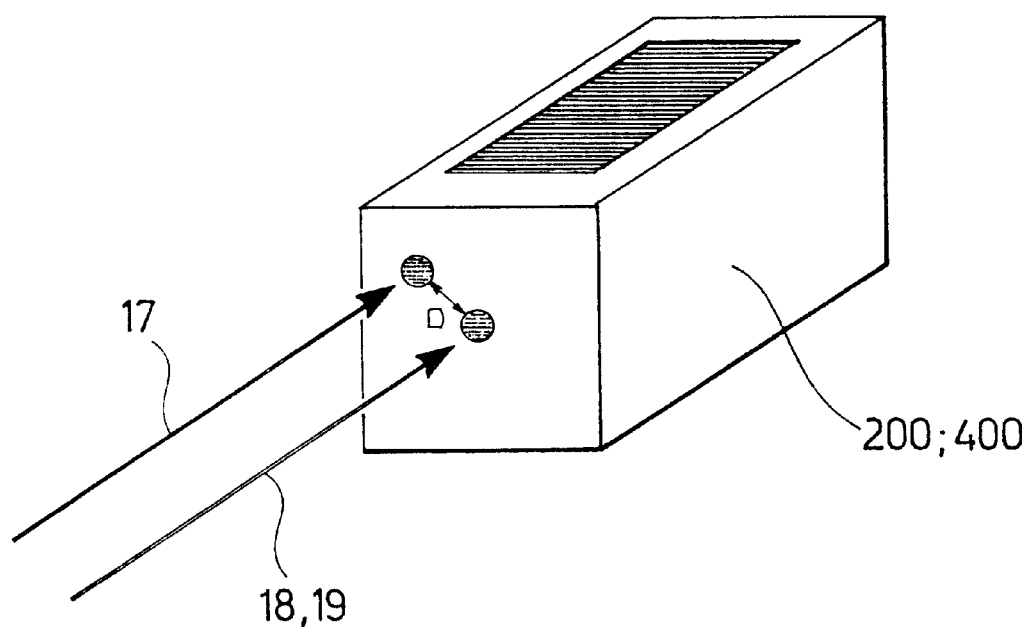
FIG. 8 illustrates the experiment which enabled determination of the minimum distance required so that an optical control beam does not influence a polarized optical signal within a crystalline element having no internal planes of separation.

FIG. 8 illustrates an experiment in which two polarized optical signals 17 and 18 with wavelengths of approx. 1550 nm have been made to propagate substantially parallel to one another in a monocrystal 200; 400. A continuous optical control beam 19 with a wavelength of approx. 1064 nm was fibre-coupled to the polarized optical signal 18 such that, issuing from the said fibre, the signals would be propagated in free space along the said sole monocrystal 200; 400, well superimposed and collinear.

The polarized optical signal 18 was then kept steady in the centre of the crystal whilst the position of the polarized optical signal 17 was made to vary within the monocrystal 200; 400 using a mechanical micropositioner.

The results of the experiments have thus shown that, at a distance D of approx. 0.5 mm from the optical control beam 19, the polarized optical signal 17 is no longer substantially influenced by the shielding effect created by the said optical control beam 19, unless the latter does not have a power greater than that which is strictly necessary to control the polarized optical signal 18 (approx. 150 $\mu$W CW corresponding to approx. 0.5 mW/mm$^2$ for an optical control beam diameter of approx. 600 $\mu$m).

The foregoing experimental results indicate that it is possible to make an optical switching device in which each of the polarized optical signals is associated with its respective optical control beam.

As shown in FIG. 1, the said first and the said second optical control pulse beams 320 and 310 with wavelengths equal to approx. 1064 nm are preferably generated by a Q-switched Nd:YAG laser 300. The duration FWHM of the said pulses is approx. 5 ns. The optical control beam 3000 issuing from the said laser 300 is split into two equal parts by means of a beam-splitter 33 and coupled to a first 32 and an second 31 multimode power optical fibre in which the core diameter is approx. 600 $\mu$m. The lengths of the said first and second optical fibres 32 and 31 differ from one another in order to ensure that the said first and second optical pulses 320 and 310 are incident on the said monocrystals 200 and 400 of the said first and the said second elementary modules 2000 and 4000, respectively, at different times. The delay $t_w$ between the said first and second optical control pulses 320 and 310 determines, as described above, the duration of the opening time of the switching device according to the invention. Two plane-convex lenses 15 and 25 with focals of approx. 30 mm collimate the said first and second optical control beams 320 and 310 issuing from the said first and second optical fibres 32 and 31 such that the diameter of the beams (spot)incident on the said monocrystals 200 and 400 is approx. 7 mm. In this manner, the said first and second optical control beams 320 and 310 completely illuminate the entry surface of the said monocrystals 200 and 400, which measures approx. 5×5 mm. In addition, the said plane-convex lenses 15 and 25 guide in free space the said first and second optical control beams 320 and 310 such that they are incident on the said dichroic mirror 50 at an angle of approx. 45°.

In the embodiment illustrated, the energy of the said first and second optical control pulses 320 and 310 incident on the said monocrystals 200 and 400 is equal to approx. 1 mJ. With such an energy, the time $t_{on}$ of the said monocrystals 200 and 400 is equal to the rise time of the said first and second control pulses (approx. 3 ns).

In the case of CdTe:In monocrystals, it has been observed in experiments that in order to switch the device of the present invention it is sufficient for the said first and second optical control pulses 320 and 310 to have an energy greater than or equal to 350 $\mu$J.

Figure 6:
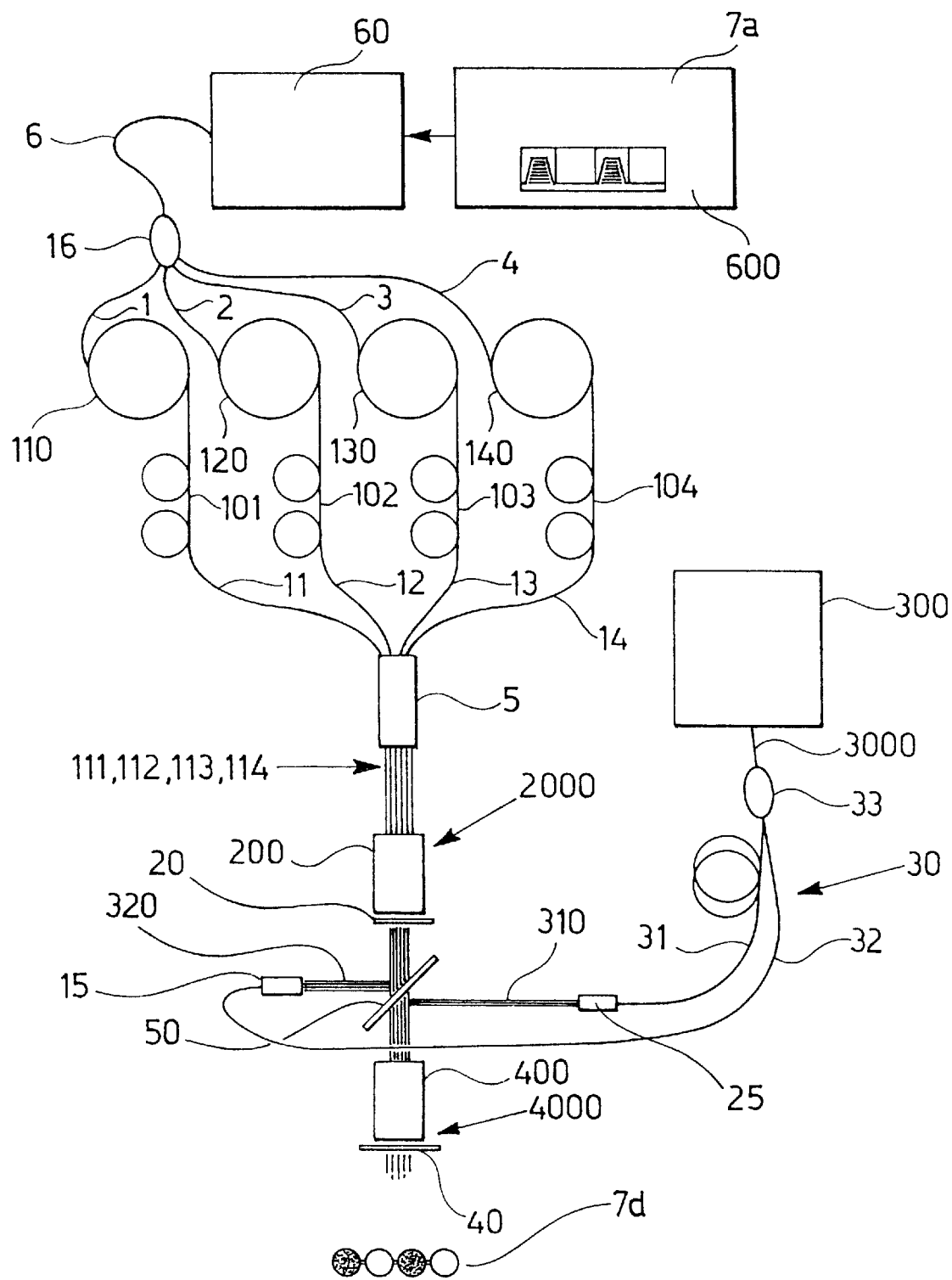
FIG. 6 shows an embodiment of a time-space converter made by means of the device in FIG. 1.

In the embodiment in FIG. 6, the optical switching device according to the invention was used to make a time-space converter suitable for processing 4-bit words in parallel mode.

The said time-space converter is capable of converting a temporal series of bits into a spatial figure carrying the same amount of information. It can thus be used as an interface between an optical-fibre transmission channel and a subsequent section of parallel, free-space, all-optical digital information processing of a polarized optical signal.

Figure 7:
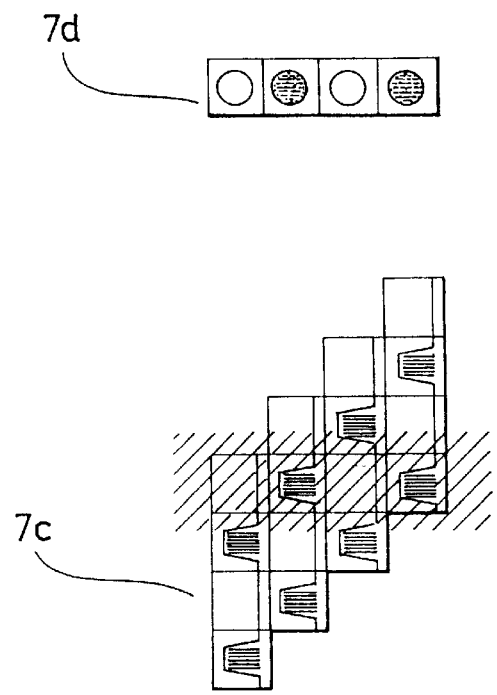
FIG. 7 shows the logic diagram of the functioning of the time-space converter in FIG. 6.
Figure 7:
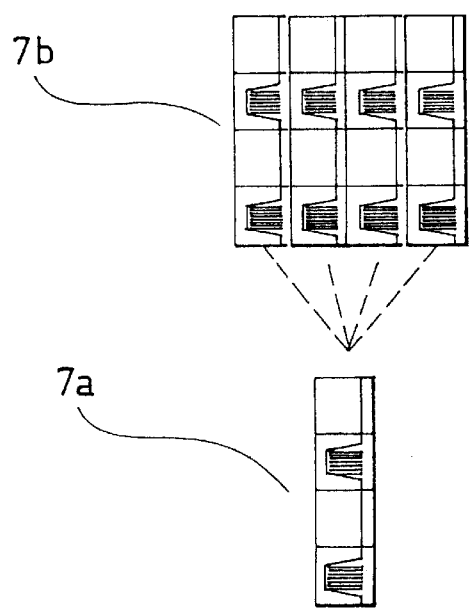

FIG. 7 illustrates the transformation of a four-bit temporal series 7a into a four-bit spatial FIG. 7d carrying the same information as 7a. The procedure involves the following:

cloning the temporal series 7a into four identical temporal series indicated in their entirety by 7b;

delaying, by means of delay lines 110, 120, 130 and 140, the temporal series 7b with respect to one another, by a time which is a multiple of the bit time, thus giving rise to the time-space FIG. 7c;

selecting opportunely, from the time-space FIG. 7c, the FIG. 7d by means of appropriate elementary switching modules 2000, 4000.

The time-space converter of FIG. 6 comprises a pigtailed DFB semiconductor laser 60 transmitting at 1550 nm, modulated by a word-generator 600 at a frequency of approx. 140 Mbit/s, which generates a polarized optical signal 6 comprising at least one four-bit temporal series 7a.

The power of the said polarized optical signal 6 issuing from the laser is approx. 1 mW. An optical amplifier (not shown in the figure), for example an erbium-doped-fibre optical amplifier with variable gain, enables a power of approx. 15 mW to be obtained in input to the converter, such as to increase the power of the said polarized optical signal 6 and offset the losses of the subsequent stages.

A 1×4 optical-fibre coupler 16 clones the said polarized optical signal 6 thus amplified, comprising the said at least one four-bit temporal series 7a, such as to obtain the said four identical, temporally-synchronized temporal series 7b.

Four optical fibre lines 110, 120, 130 and 140 of varying lengths delay the said four temporal series 7b with respect to one another by amounts which are multiples of the bit time which at approx. 140 Mbit/s, is approx. 7.12 ns, thus giving rise to the time-space FIG. 7c. Since the velocity of light in glass is equal to approx. 2×10$^8$ m/s, in order to bring about a delay of 7.12 ns, the distance must be extended by 1.428 m. The fibre line 110 from which the first bit is extracted is extended by 4.284 m, line 120 corresponding to the second line is extended by 2.856 m, line 130 corresponding to the third line is extended by 1.428 m, whilst the fibre line 140 corresponding to the fourth bit is not extended. The said fibre lines 110, 120, 130 and 140 are wound on a coil of sufficiently large diameter so that losses owing to an excessive curvature are not incurred.

Having thus delayed the first temporal series by a time equal to three times the bit time, the second temporal series by a time equal to two times the bit time, the third temporal series by a time equal to one times the bit time, and having not delayed the fourth temporal series, issuing from the said four fibre lines 110, 120, 130 and 140 are simultaneously found the first, second, third and fourth bits of the said temporal series 7a to be converted, corresponding respectively to the said four optical fibre lines 110, 120, 130 and 140.

At this point it is possible to obtain the desired spatial FIG. 7d corresponding to the four-bit temporal series 7a by means of the optical switching device according to the invention. In point of fact, the said device is capable of selecting from each of the said optical fibre lines 110, 120, 130 and 140, a single bit acting simultaneously on all of the said time-space series 7c, allowing only the selected bit to pass through each of these and blocking all of the others.

In this case, the duration of the opening time of the device according to the invention shall be equal to the bit time, whilst the interval between two subsequent selections shall be equal to the duration of the bit sequence being converted which, in the example in FIG. 6, is four times the bit time.

Figure 17:
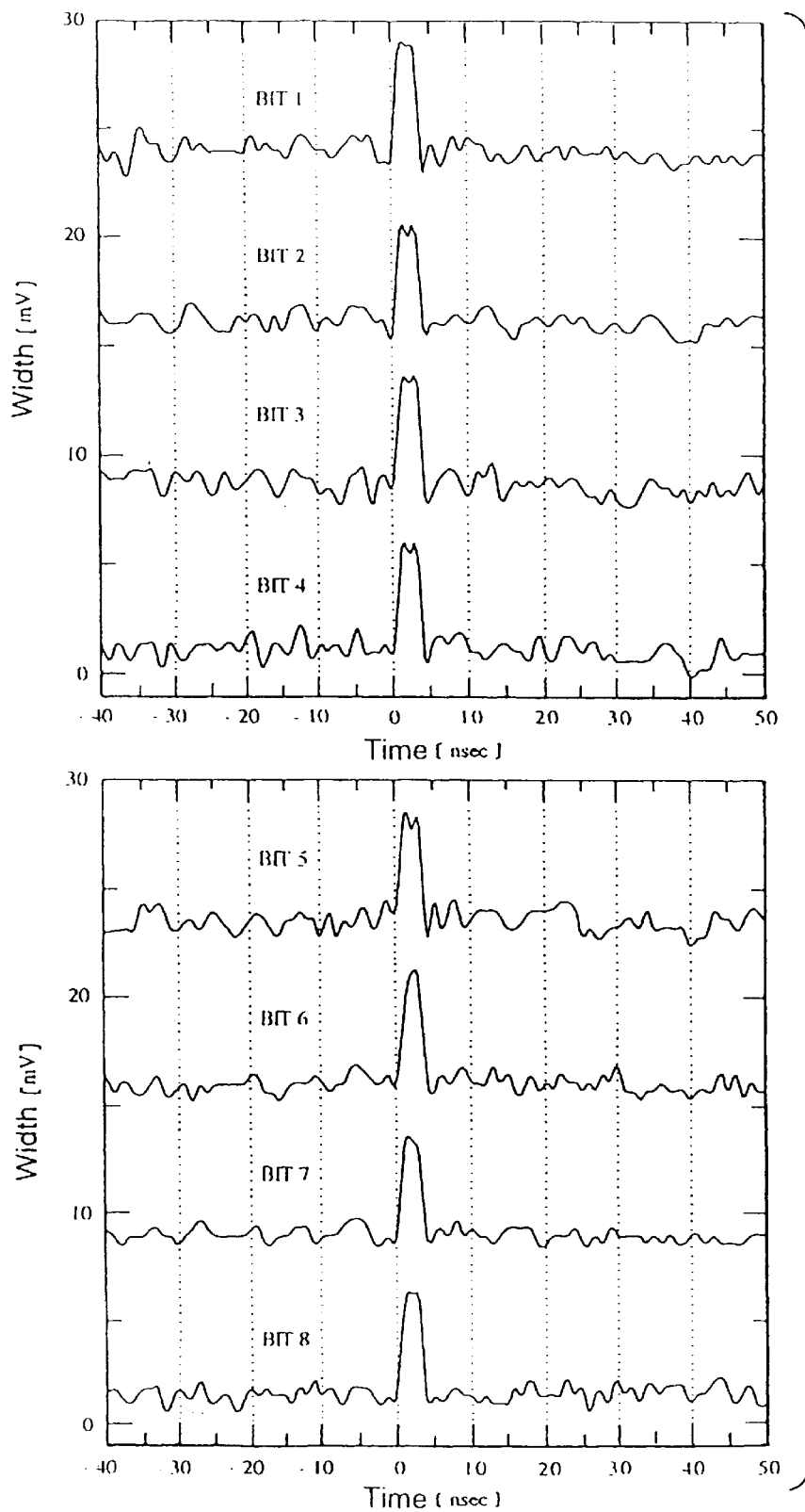
FIG. 17 provides a graphic representation of an eight-bit spatial figure issuing from an embodiment of a time-space converter which processes 8 polarized optical signals.

FIG. 17 shows the recording, obtained via a suitable photoreceiver and oscilloscope with passbands of approx. 1 GHz, of a 140 Mbit/s, eight-bit "11111111" spatial figure issuing from a time-space converter similar to that in FIG. 6, but which processes 8 polarized optical signals collimated via the said means 5 of collimation in FIGS. 9a and 9b. The bits issuing from the optical switching device, which constitute the spatially-coded word, are thus ready to be subjected to subsequent processings, and then be converted once more into a four-bit temporal series by means of a suitable space-time converter which will be a mirror-image of the time-space converter described above.

Figure 10:
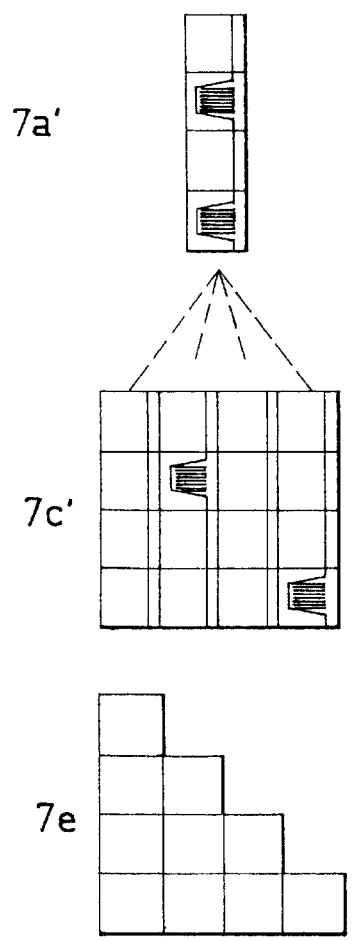
FIG. 10 shows the logic diagram of the functioning of an embodiment of a space-time converter made by means of the device in FIG. 1.
Figure 10:
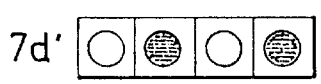
Figure 10:
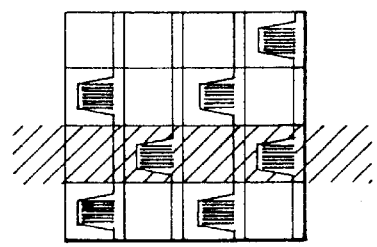
Figure 11A:
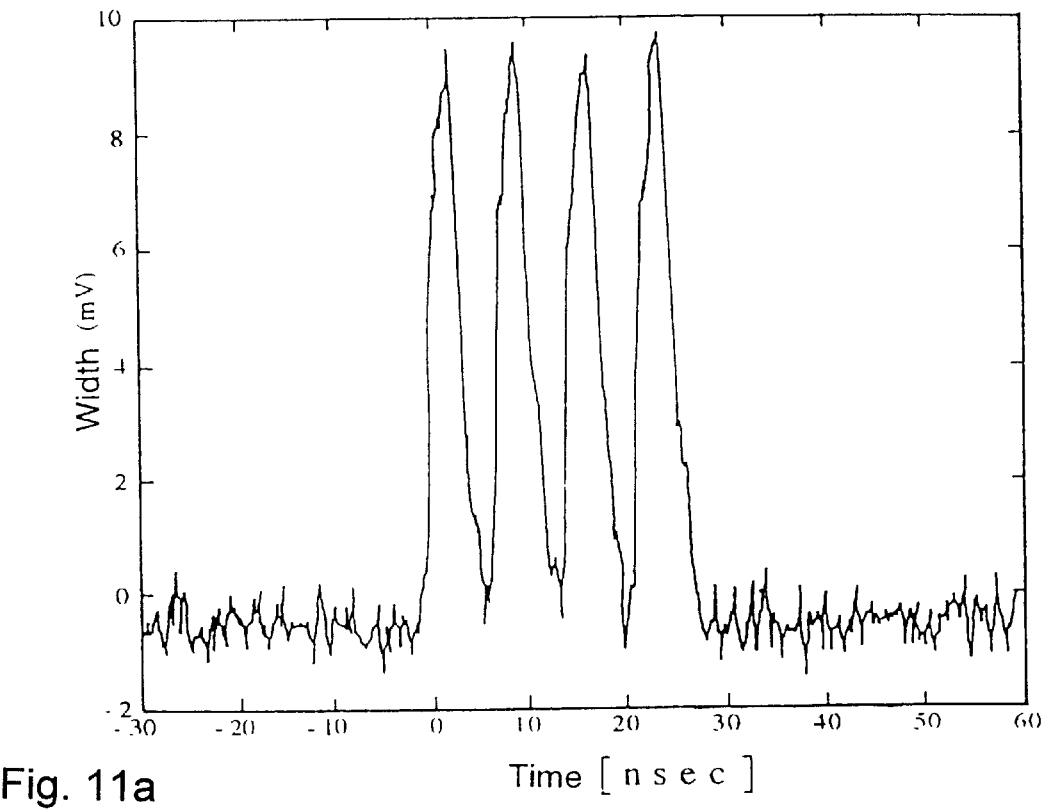
FIGS. 11a and 11b provide a graphic representation of a 4-bit signal entering (FIG. 11a) and issuing from (FIG. 11b) a time-space-time converter, made by means of the device in FIG. 1.
Figure 11B:
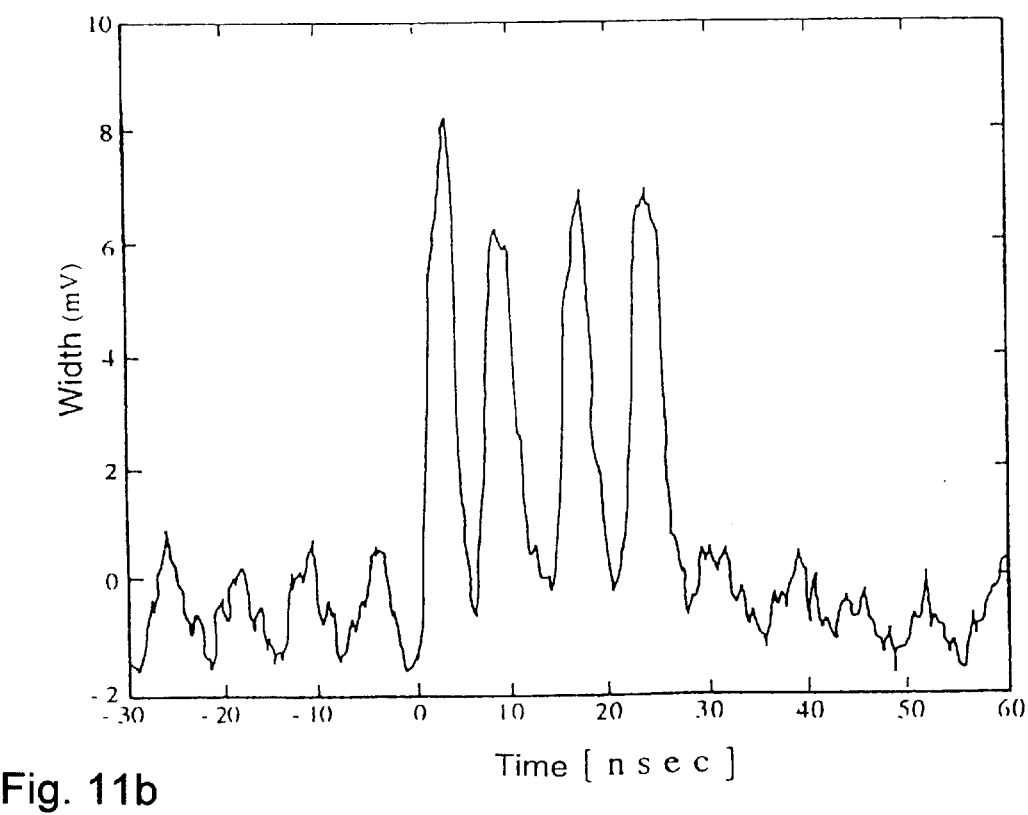
Figure 12A:
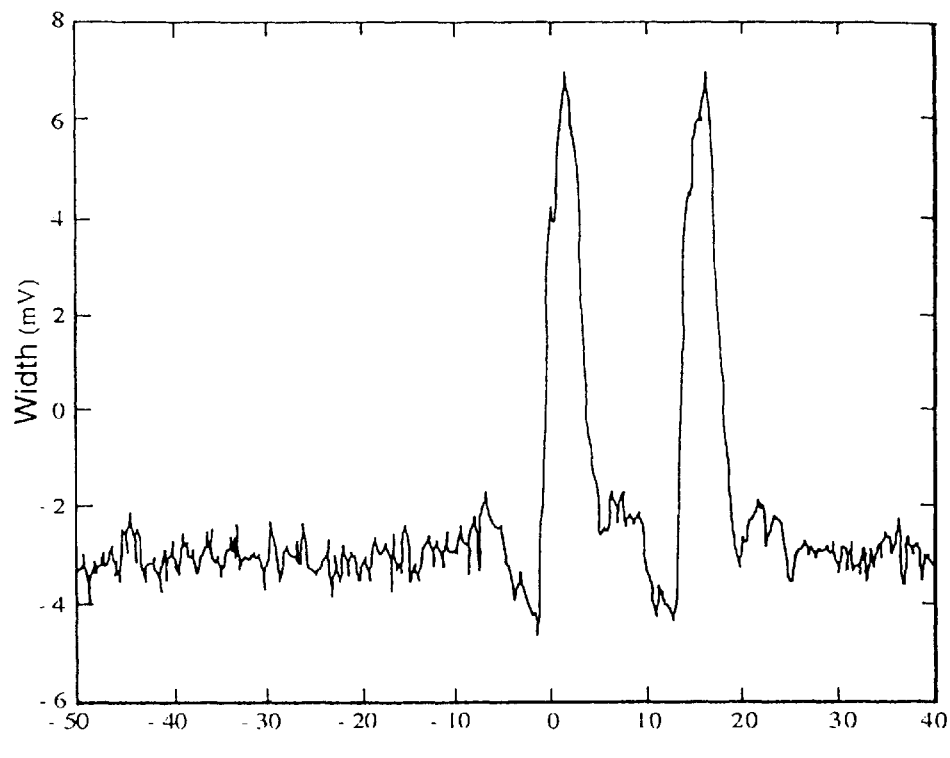
FIGS. 12a and 12b provide a graphic representation of a 4-bit signal entering (FIG. 12a) and issuing from (FIG. 12b) a time-space-time converter, made by means of the device in FIG. 1.
Figure 12B:
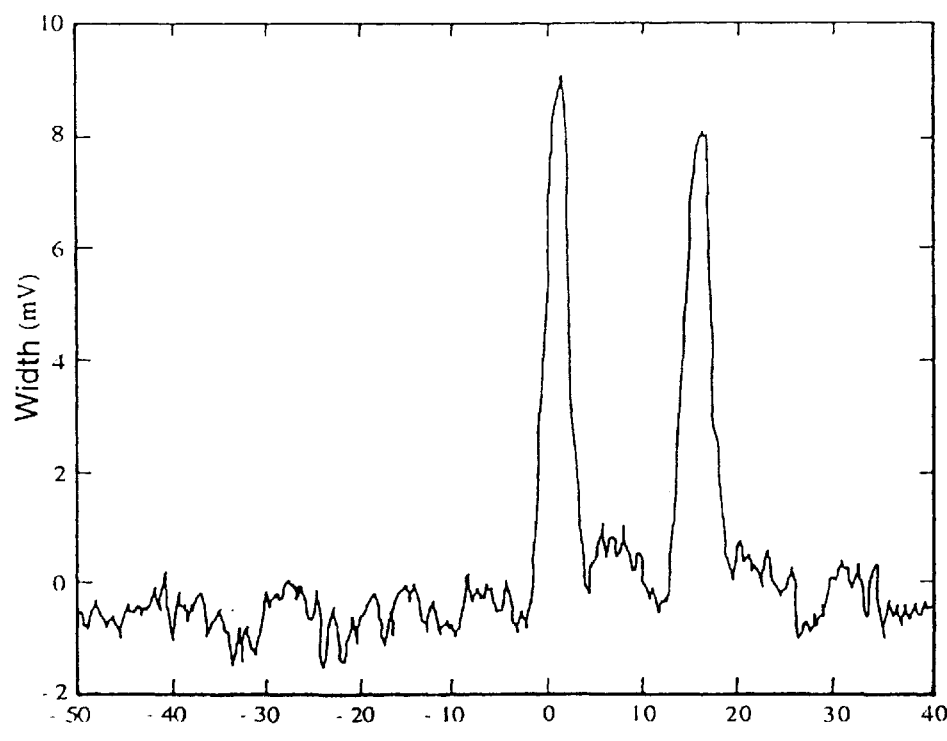
Figure 13A:
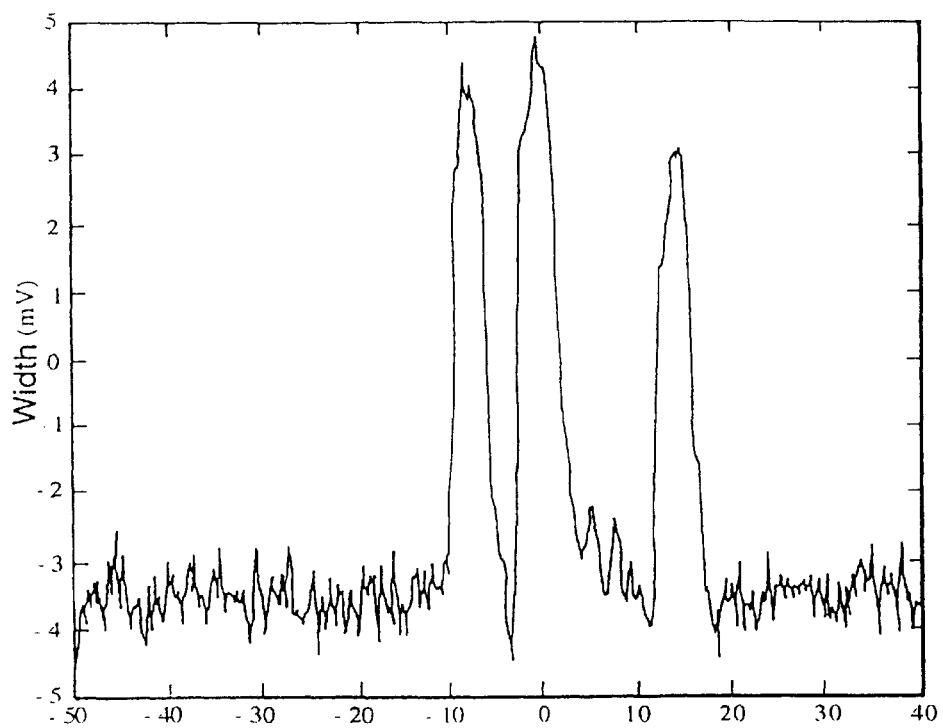
FIGS. 13a and 13b provide a graphic representation of a 4-bit signal entering (FIG. 13a) and issuing from (FIG. 13b) a time-space-time converter, made by means of the device in FIG. 1.
Figure 13B:
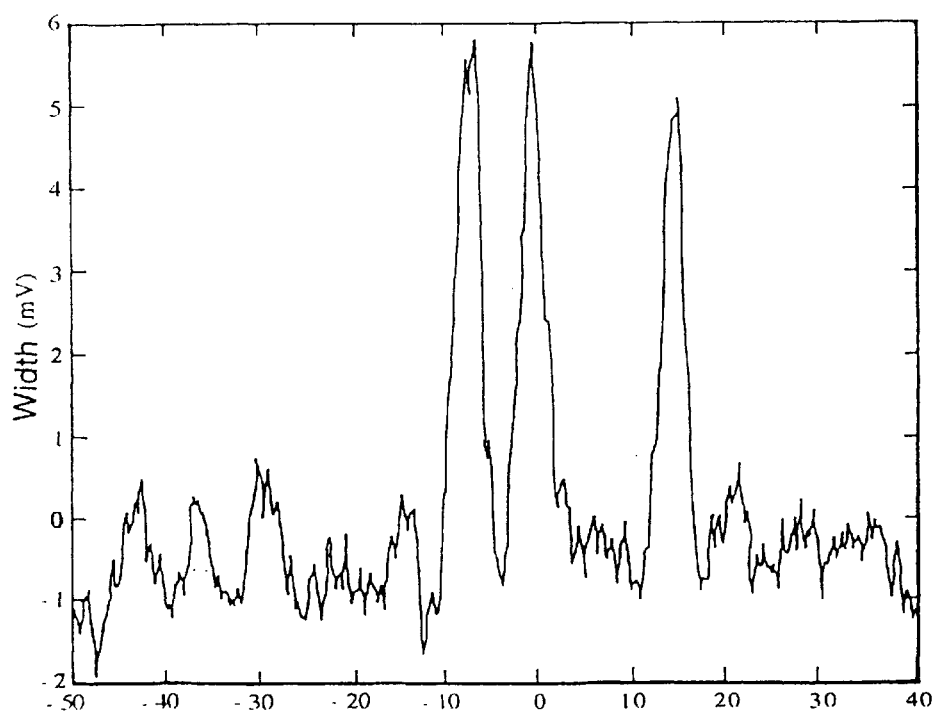
Figure 14A:
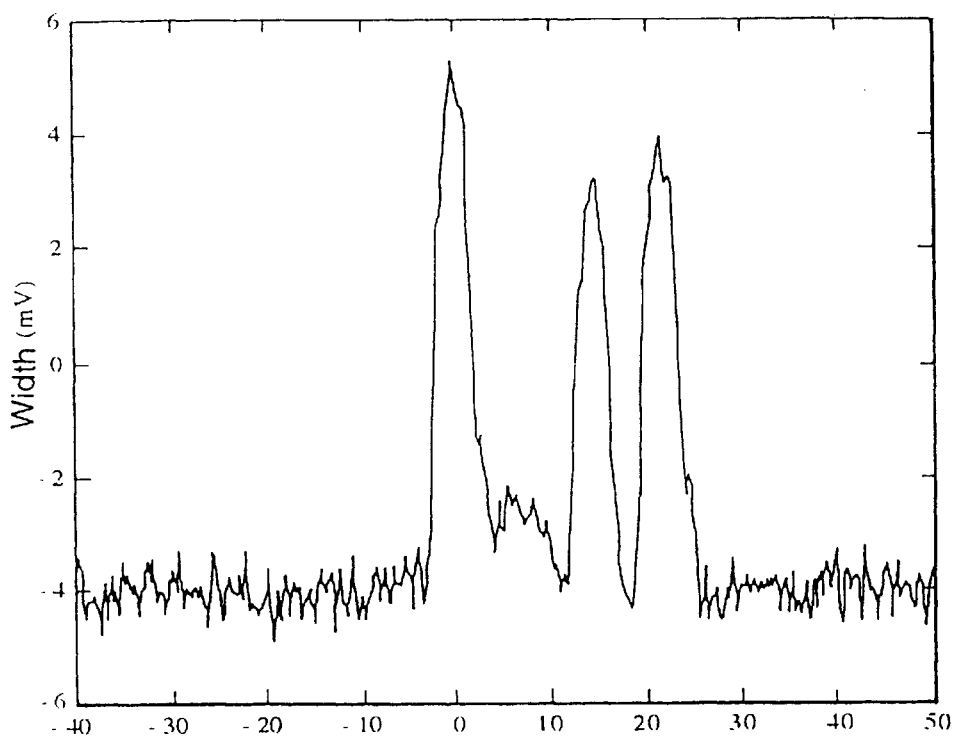
FIGS. 14a and 14b provide a graphic representation of a 4-bit signal entering (FIG. 14a) and issuing from (FIG. 14b) a time-space-time converter, made by means of the device in FIG. 1.
Figure 14B:
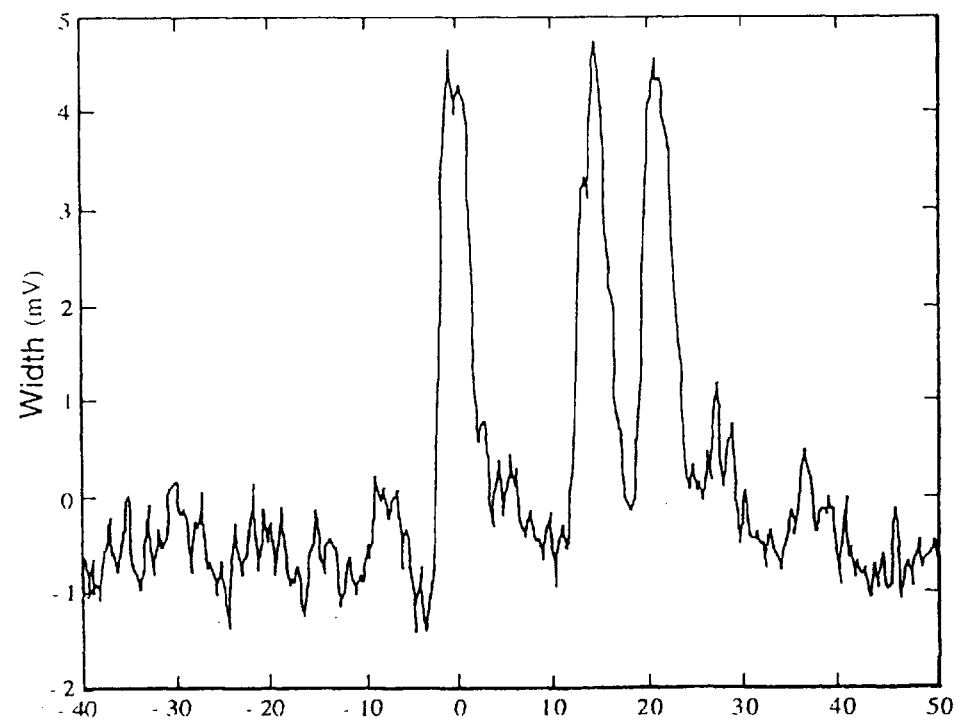

FIG. 10 illustrates the transformation of a four-bit spatial FIG. 7d, optionally processed, into a four-bit temporal series 7a'. The space-time conversion procedure is a mirror image of the time-space conversion procedure and involves the following:

focusing, via suitable means of focusing 5' (not shown), which are mirror images of the said means of collimation 5, the said four bits in free space of the said spatial FIG. 7d in four optical-fibre delay lines 7e;

delaying, via the said appropriately-sized delay lines 7e, the said four bits of the said spatial FIG. 7d with respect to one another by a time which is a multiple of the bit time, inversely with respect to the corresponding time-space converter, thus giving rise to the space-time FIG. 7c;

translating the said space-time FIG. 7c into the said four-bit temporal series 7a'.

FIGS. 11, 12, 13 and 14 show the recording of four 140-Mbit/s, four-bit temporal series, respectively 1111, 1010, 1101 and 1011, obtained via a suitable photoreceiver and oscilloscope with passbands of approx. 1 GHz, entering (FIGS. 11a, 12a, 13a and 14a) and issuing from (FIGS. 11b, 12b, 13b and 14b) a time-space-time converter made via the time-space converter of FIGS. 6 and 7 and the space-time converter of FIG. 10. The said recordings show that:

1) the said delay lines 110, 120, 130 and 140 of the time-space converter have been appropriately sized so as to enable all the incoming bits of the temporal series 7a to be selected simultaneously by the optical switching device without being distorted. In point of fact, all of the pulses constituting the outgoing temporal series 7a' are nearly equal in height and length;

2) the said means of collimation 5 and of focusing 5' have been appropriately executed so as to achieve proper uniformity of the bits of the outgoing temporal series 7a';

3) the said delay lines 7e of the space-time converter have been appropriately sized so that the said outgoing temporal series 7a' has the same bit rate as the said incoming temporal series 7a. In point of fact, the various outgoing bits are separated from one another by the same time gap, equal to approx. 7.2 ns, corresponding to the bit time at approx. 140 Mbits.

We claim:

1. Optical switching device comprising:
   a) a first elementary switching module which in turn comprises
      i) a crystalline element without internal planes of separation and which is capable of rotating a plane of polarization of a polarized optical signal by a predetermined angle under action of an optical control beam, and
      ii) a polarization analyzer capable of selecting, according to a predetermined plane, the said polarized optical signal issuing from the said crystalline element,
   b) first means of supplying the said polarized optical signal to the said elementary switching module, and
   c) second means for supplying the said optical control beam to the said elementary switching module, characterized in that the said first and second means route at least two different polarized optical signals and at least one optical control beam in the said crystalline element such that the said at least one control beam is substantially collinear with and superimposed on the said at least two polarized optical signals.

2. Optical switching device according to claim 1, characterized in that the said first and second means route at least two different polarized optical signals and at least two optical control beams (a; b; c; d; a'; b'; c'; d') in the said crystalline element such that each of the said optical control beams are substantially collinear with and superimposed on just one of the said at least two polarized optical signals.

3. Optical switching device according to claim 1, characterized in that the said crystalline element of the said first elementary switching module consists of a monocrystal.

4. Optical switching device according to claim 3, characterized in that the said monocrystal is of indium-doped cadmium telluride (CdTe:In).

5. Optical switching device according to claim 3, characterized in that the said monocrystal is associated with electrodes for applying a voltage chosen so as to rotate by a predetermined angle the plane of polarization of the said at least two polarized optical signals.

6. Optical switching device according to any one of claims 1, 2 or 5, characterized in that it also comprises means for controlling, and if need be varying, the state of polarization of the said at least two polarized optical signals.

7. An optical switching device comprising:
   a) a first elementary switching module which in turn comprises i) a crystalline element without internal planes of separation and which is capable of rotating a plane of polarization of a polarized optical signal by a predetermined angle under action of an optical control beam, and ii) a polarization analyzer capable of selecting, according to a predetermined plane, the said polarized optical signal issuing from the said crystalline element;

b) first means of supplying the said polarized optical signal to the said elementary switching module;

c) second means for supplying the said optical control beam to the said elementary switching module, characterized in that the said first and second means route at least two different polarized optical signals and at least one optical control beam in the said crystalline element such that the said at least one control beam is substantially collinear with and superimposed on the said at least two polarized optical signals; and d) a pair of polarization rotators for controlling, and if need be varying, the state of polarization of the said at least two polarized optical signals.

8. Optical switching device according to claim 7, characterized in that the said pair of polarization rotators consists of two discs on which optical fibre coils are wound.

9. Optical switching device according to claim 8, characterized in that the diameter of the said coils is selected so as to make a $\lambda/4$ plate via a single winding of fibre.

10. Optical switching device according to claim 8, characterized in that the diameter of the said coils is selected so as to make a $\lambda/2$ plate via two windings of fibre.

11. Optical switching device according to claim 8, characterized in that it also comprises means of collimation disposed downstream of the said means capable of controlling, and if need be varying, the state of polarization and upstream of the said first elementary switching module, so as to guide the said at least two polarized optical signals in free space in a predetermined direction, and keep them within predetermined transverse dimensions.

12. Optical switching device according to any one of claims 1, 2 or 5, characterized in that the wavelength of the said at least two polarized optical signals lies between 1000 and 1600 nm.

13. Optical switching device according to claim 1 or 2, characterized in that the said second means consist of at least one laser source which generates a beam of optical control pulses.

14. An optical switching device comprising:

a) a first elementary switching module which in turn comprises i) a crystalline element without internal planes of separation and which is capable of rotating a plane of polarization of a polarized optical signal by a predetermined angle under action of an optical control beam, and ii) a polarization analyzer capable of selecting, according to a predetermined plane, the said polarized optical signal issuing from the said crystalline element;

b) first means of supplying the said polarized optical signal to the said elementary switching module; and c) a Q-switched laser for supplying the said optical control beam to the said elementary switching module, characterized in that the first means and the Q-switched laser route at least two different polarized optical signals and at least one optical control beam in the said crystalline element such that the said at least one control beam is substantially collinear with and superimposed on the said at least two polarized optical signals.

15. Optical switching device according to claim 1, characterized in that it also comprises at least one second elementary switching module.

16. Optical switching device according to claim 15, characterized in that the polarization analyzer of the said first elementary module is oriented substantially orthogonally with respect to the polarization analyzer of the said at least one second elementary module.

17. Optical switching device according to claim 15 or 16, characterized in that the said first and the said at least one second elementary switching module are arranged in series.

18. Optical switching device according to claim 15 or 16, characterized in that the said second means also comprise a means for splitting the said optical control beam into a first and at least one second optical control beam.

19. An optical switching device comprising:

a) a first elementary switching module which in turn comprises i) a crystalline element without internal planes of separation and which is capable of rotating a plane of polarization of a polarized optical signal by a predetermined angle under action of an optical control beam, and ii) a polarization analyzer capable of selecting, according to a predetermined plane, the said polarized optical signal issuing from the said crystalline element;

b) first means of supplying the said polarized optical signal to the said elementary switching module;

c) second means for supplying the said optical control beam to the said elementary switching module, characterized in that the said first and second means route at least two different polarized optical signals and at least one optical control beam in the said crystalline element such that the said at least one control beam is substantially collinear with and superimposed on the said at least two polarized optical signals, wherein said second means comprises, means for splitting the said optical control beam into a first and at least one second optical control beam; and d) means capable of guiding the said first and the said at least one second optical control beam to the crystalline element, capable of rotating the plane of polarization of a polarized optical signal by a predetermined angle under the action of an optical control beam, of the said first and, respectively, of the said at least one second elementary switching module.

20. Optical switching device according to claim 19, characterized in that the said guiding means capable of guiding the said first optical control beam consist of a first optical fibre.

21. Optical switching device according to claim 19, characterized in that the said guiding means capable of guiding the said at least one second optical control beam consist of at least one second optical fibre.

22. Optical switching device according to claim 21, characterized in that the said first optical fibre and the said at least one second optical fibre are of different lengths, so that the said first and the said at least one second optical control beam reach at different times the said element of the said first and, respectively, the said at least one second elementary switching module.

23. Optical switching device according to claim 18, characterized in that it also comprises a dichroic mirror disposed downstream of the said first elementary module and upstream of the said at least one second elementary module.

24. Optical switching device according to claim 23, characterized in that the said dichroic mirror is transparent to the wavelength of the said at least two polarized optical signals and reflects the wavelength of the said first and the said at least one second optical control beam.

25. Optical switching device according to claim 24, characterized in that the said dichroic mirror is substantially tilted by 45° with respect to the direction of the said at least two polarized optical signals and of the said first optical control beam, the direction of the said at least two polarized optical signals being substantially orthogonal with respect to the direction of the said first optical control beam.

26. Optical switching device according to claim 25, characterized in that the said dichroic mirror is substantially tilted by 45° also with respect to the direction of the said at least one second optical control beam, the direction of the said at least two polarized optical signals being substantially orthogonal also with respect to the direction of the said at least one second optical control beam.

27. Optical switching device according to claim 24, characterized in that it comprises means of collimation for guiding in free space the said first and the said at least one second optical control beam such that they are incident on the said dichroic mirror at approx. 45°, and which, after being reflected onto the said dichroic mirror are substantially collinear with and superimposed on the said at least two polarized optical signals.

28. An optical switching device comprising:
    a) a first elementary switching module comprising
        i) a crystalline element without internal planes of separation and which is capable of rotating a plane of polarization of a polarized optical signal by a predetermined angle under action of an optical control beam, and
        ii) a polarization analyzer capable of selecting, according to a predetermined plane, the polarized optical signal issuing from the crystalline element,
    b) first means of supplying the polarized optical signal to the elementary switching module, and
    c) second means for supplying the optical control beam to the elementary switching module, characterized in that the first and second means route at least two different polarized optical signals and at least one optical control beam in the said crystalline element such that each of the optical control beams are substantially collinear with and superimposed on just one of the at least two polarized optical signals.

29. A method for switching an optical switching device comprising:
    providing a first elementary switching module which in turn comprises
        a crystalline element without internal planes of separation and which is capable of rotating the plane of polarization of a polarized optical signal by a predetermined angle under action of an optical control beam, and
        a polarization analyzer capable of selecting, according to a predetermined plane, the said polarized optical signal issuing from the said crystalline element;
    supplying the polarized optical signal to the elementary switching module;
    supplying the optical control beam to the elementary switching module; and
    routing at least two different polarized optical signals and at least one optical control beam in the crystalline element such that the at least one control beam is substantially collinear with and superimposed on the at least two polarized optical signals.

* * * * *